(12) United States Patent
Franceschini

(10) Patent No.: US 11,174,944 B2
(45) Date of Patent: Nov. 16, 2021

(54) RADIALLY DISPLACEABLE BRUSH SEAL

(71) Applicant: ROLLS-ROYCE plc, London (GB)

(72) Inventor: Gervas Franceschini, Derby (GB)

(73) Assignee: ROLLS-ROYCE PLC, London (GB)

( * ) Notice: Subject to any disclaimer, the term of this patent is extended or adjusted under 35 U.S.C. 154(b) by 149 days.

(21) Appl. No.: 16/565,598

(22) Filed: Sep. 10, 2019

(65) Prior Publication Data
US 2020/0080646 A1 Mar. 12, 2020

(30) Foreign Application Priority Data
Sep. 10, 2018 (GB) ...................................... 1814674

(51) Int. Cl.
*F16J 15/3288* (2016.01)
*F01D 11/12* (2006.01)
*F16J 15/3276* (2016.01)

(52) U.S. Cl.
CPC ......... *F16J 15/3288* (2013.01); *F01D 11/127* (2013.01); *F16J 15/3276* (2013.01)

(58) Field of Classification Search
CPC ........ F16J 15/00; F16J 15/3288; F16J 15/328; F16J 15/3268; F16J 15/3272; F16J 15/3276; F01D 11/00; F01D 11/127
USPC ...................................................... 277/355
See application file for complete search history.

(56) References Cited

U.S. PATENT DOCUMENTS

| | | | | |
|---|---|---|---|---|
| 6,173,962 B1 * | 1/2001 | Morrison | ............. | F16J 15/3288 277/355 |
| 7,021,631 B2 * | 4/2006 | Wright | ................. | F16J 15/3288 277/355 |
| 7,434,813 B1 * | 10/2008 | Franceschini | ........ | F16J 15/3288 277/355 |
| 8,317,464 B2 * | 11/2012 | Alamsetty | ............ | F16J 15/3288 415/170.1 |
| 8,454,023 B2 * | 6/2013 | Samudrala | ............ | F01D 11/001 277/411 |
| 2002/0130469 A1 * | 9/2002 | Kono | ................... | F16J 15/3288 277/355 |
| 2009/0315272 A1 * | 12/2009 | Kasahara | .................. | F02C 7/28 277/355 |

(Continued)

FOREIGN PATENT DOCUMENTS

| | | |
|---|---|---|
| EP | 1 653 130 A1 | 5/2006 |
| EP | 1 653 129 B1 | 8/2008 |

(Continued)

OTHER PUBLICATIONS

Search Report of the United Kingdom Intellectual Property Office for GB1814674.6 with search date of Feb. 11, 2019.

(Continued)

*Primary Examiner* — Nathan Cumar
(74) *Attorney, Agent, or Firm* — Oliff PLC

(57) ABSTRACT

A brush seal for sealing a leakage gap in an axial flow path between a relatively higher fluid pressure region and a relatively lower fluid pressure region, that includes an outer housing and an inner housing located at least partially within and configured for radial displacement relative to the outer housing, wherein the upstream facing inner surface of the outer housing is free of any protrusion toward the first downstream facing outer contact surface and second downstream facing outer contact surface.

20 Claims, 14 Drawing Sheets

(56) References Cited

U.S. PATENT DOCUMENTS

| | | | |
|---|---|---|---|
| 2011/0200432 A1* | 8/2011 | Alamsetty | F16J 15/3288 |
| | | | 415/230 |
| 2012/0286476 A1* | 11/2012 | Samudrala | F01D 11/025 |
| | | | 277/301 |
| 2013/0043658 A1* | 2/2013 | Zheng | F02C 7/28 |
| | | | 277/355 |
| 2016/0069260 A1* | 3/2016 | Speak | F02K 3/06 |
| | | | 415/69 |

FOREIGN PATENT DOCUMENTS

| | | |
|---|---|---|
| EP | 2357385 A1 | 8/2011 |
| EP | 2522811 A2 | 11/2012 |
| WO | WO2014014426 A2 | 1/2014 |

OTHER PUBLICATIONS

Feb. 10, 2020 Extended Search Report issued in European Patnet Application No. 19192039.6.

* cited by examiner

RADIALLY DISPLACEABLE BRUSH SEAL

CROSS-REFERENCE TO RELATED APPLICATIONS

This specification is based upon and claims the benefit of priority from UK Patent Application Number 1814674.6 filed on 10 Sep. 2018, the entire contents of which are incorporated herein by reference.

BACKGROUND

Field of the Disclosure

The present disclosure concerns a fluid seal. More particularly, the present disclosure concerns a brush seal for sealing a leakage path between relatively movable parts.

Description of the Related Art

It is known to use pressure-balanced brush seals and standard plain backing ring brush seals to establish a fluid seal between relatively movable components. Typically, a brush seal comprises a pack of resilient bristles that are fixed to one of the components and are in sliding relationship with the other component. For instance, an annular brush seal positioned in a leakage path between a rotatable shaft and static structure surrounding the shaft. The seal bristles in such an application are normally bonded to a mounting ring in turn carried in the static structure. The bristles are generally radially inwardly directed so that their free ends engage the shaft in sliding relationship. Together, the bristle pack and the shaft surface cooperate to define a leakage barrier between a region of high fluid pressure and low fluid pressure.

Under the influence of a pressure drop the bristles tend to deform. To counter this effect, a backing member is used to provide additional support for the bristles on the downstream, low pressure side of the bristles and extends from the mounting member alongside the downstream face of the bristle pack to terminate short of the free ends of the bristles, thereby providing the necessary degree of axial support for the bristles. Such backing members may be statically configured, or may be radially displaceable, relative to an axis of rotation of the rotatable shaft and static structure surrounding the shaft.

A drawback of such arrangements is that large build offsets and non-axisymmetric movements provide a requirement to increase the backing member to rotor clearance, which is detrimental to brush seal performance and component life expectancy. A previous solution to the contradiction of a small backing ring clearance for performance, and large backing ring clearance for movement accommodation, was the floating brush seal proposed in U.S. Pat. No. 7,434,813. At low shaft speeds this showed promising behaviour. However, to prevent rotation of the inner sealing element, a pin and slot has previously been suggested, which allows both sliding and pivoting within the arrangement, and creates a seal, where the position of the pin within the slot is crucial for its behaviour and in particular, its dynamic behaviour. Thus, the metal-on-metal contact at the sliding interface gave rise to fretting wear susceptibility.

Furthermore, in some arrangements, such as the pressure-balanced brush seal and standard plain backing ring brush seal, either or both of excessive and repetitive bristle pack movement can score and scratch the backing member, eventually leading to fretting wear. Principally this is possible because of an unlubricated contact between the bristles and the backing member. Passive pressure-balanced brush seals provide an improvement over standard plain backing member brush seals in this regard. In passive pressure-balanced brush seals, the contact loading at the backing member interface is reduced by encouraging upstream air to pressurise a cavity in the backing member. While this is advantageous from an overall sealing performance point of view, reduced contact loading can reduce the friction between the bristles and the backing member, allowing greater circumferential and radial movement of the bristles within the bristle pack. Furthermore, the inclusion of the cavity in the backing member can limit the surface for bristle contact with the backing ring. Thus, although contact loading may be reduced, the contact pressure may be higher than desired. Generally, wear has been found to correlate with contact pressure, and may be further influenced by surface speed and interface temperature. Thus, a seal is desired which provides improved resistance to fretting wear, whilst providing improved stiffness and dynamic behaviour.

SUMMARY

According to a first aspect, there is provided a brush seal for sealing a leakage gap in an axial flow path between a relatively higher fluid pressure region and a relatively lower fluid pressure region. The brush seal may comprise an outer housing and an inner housing located at least partially within and configured for radial displacement relative to the outer housing. The inner housing may comprise a first downstream outer contact member comprising a first downstream facing outer contact surface configured along a first radial contact line. The inner housing may comprise a second downstream outer contact member comprising a second downstream facing outer contact surface configured, and radially spaced from the first downstream facing outer contact surface, along the first radial contact line to define a downstream inner chamber opening therebetween. The inner housing may further comprise a first bristle layer in physical communication with a first upstream facing inner contact surface configured along a second radial contact line. An upstream facing surface of the outer housing may be maintained in physical communication with at least the first downstream facing outer contact surface and the second downstream facing outer contact surface during radial displacement thereof. At all relative radial positions of the inner housing relative to the outer housing, during use, a collective contact surface between the upstream facing surface of the outer housing and both the first downstream facing outer contact surface and the second downstream facing outer contact surface may be greater than a collective surface of the downstream inner chamber opening.

The arrangement may provide reduced wear between the inner housing and the outer housing. Furthermore, the arrangement may provide reduced fretting wear between the inner housing and the outer housing. The inner housing may, in some examples, be a backing member. By maximising the surface area of inner housing in contact with the outer housing, the contact surface between the inner housing and the outer housing may be increased so that the contact pressure may be reduced. Additionally or alternatively, by increasing the area of contact while maintaining the pressure balancing effect to reduce contact loading, fretting wear between the inner backing ring and outer backing ring may be reduced.

The first and second radial contact line may respectively extend along a respective first and second radial-azimuthal contact plane. The first and second radial contact lines may refer to respective first and second radial lines extending parallel to respective first and second radial-azimuthal contact planes. Thus, the first downstream facing outer contact surface may be configured along a first radial-azimuthal contact plane, and the second downstream facing outer contact surface configured, and radially spaced from the first downstream facing outer contact surface, along the first radial-azimuthal contact plane to define the downstream inner chamber opening therebetween. Furthermore, the first bristle layer may be in physical communication with the first upstream facing inner contact surface configured along a second radial-azimuthal contact plane, the upstream face of the outer housing being maintained in physical communication with at least the first downstream facing outer contact surface of the first downstream outer contact member and the second downstream facing outer contact surface of the second downstream outer contact member during radial displacement thereof.

It will be appreciated that a substantial part (e.g., at least 30% of the radial length) of the outer housing along the first radial contact line may be, in use, maintained in contact with and supported by two or more contact surfaces of the inner housing. In further examples, between about 35% and about 100% of the outer housing along the first radial-contact line may be, in use, maintained in contact with and supported by two or more contact surfaces of the inner housing. In yet further examples, between about 40% and about 100% of the outer housing along the first radial contact line may be, in use, maintained in contact with and supported by two or more contact surfaces of the inner housing. In yet further examples, between about 50% and about 100% of the outer housing along the first radial contact line may be, in use, maintained in contact with and supported by two or more contact surfaces of the inner housing.

The inner housing may comprise a first upstream outer contact member comprising a first upstream facing outer surface configured along a third radial contact line. The third radial contact line may extend along a third radial-azimuthal contact plane. The third radial contact line may refer to a third radial line extending parallel to a third radial-azimuthal contact plane. In some examples, a downstream facing surface of the outer housing may be axially spaced from the first upstream facing outer surface along the third radial contact line. In some examples, at least a portion of the downstream facing surface of the outer housing may be in contact with the first upstream facing outer surface along the third radial contact line. Thus, in some examples, at least a portion of the downstream facing surface of the outer housing may be, in use, maintained in contact with and axially support one or more upstream facing outer surfaces of the inner housing.

The inner housing may comprise a second upstream outer contact member comprising a second upstream facing outer surface configured, and radially spaced from the first upstream facing outer surface, along the third radial contact line to define an upstream inner chamber opening therebetween. In some examples, at least a portion of the downstream facing surface of the outer housing may be in contact with the first upstream facing outer surface and the second upstream facing outer surface along the third radial contact line. Thus, in some examples, at least a portion of the downstream facing surface of the outer housing may be, in use, maintained in contact with and axially support at least the first upstream facing outer surface and the second upstream facing outer surface of the inner housing.

In some examples, at all relative radial positions of the inner housing relative to the outer housing, during use, a collective contact surface between the downstream facing surface of the outer housing and the or each upstream facing outer surface of the inner housing may be greater than a collective surface of the upstream inner chamber opening.

The inner housing may comprise a second upstream facing inner contact surface configured, and radially displaced from the first upstream facing contact surface, along the second radial contact line to define a downstream inner chamber opening of a downstream inner housing chamber therebetween. By adding one or more further upstream facing contact surfaces in conjunction with a first, second or further chamber, sufficient pressure balancing of the bristle layer may be achieved, whilst optimising the surface area of the inner housing in contact with the bristle layer. Thus, additional contact surface may be achieved, whilst still maintaining a low contact force to reduce the contact pressure of the respective bristles against the inner housing.

The first bristle layer may be in physical communication with both the first upstream facing inner contact surface and the second upstream facing inner contact surface along the second radial contact line. Resolved adjacent to the second radial contact line, a collective contact surface between each of the respective upstream facing inner contact surfaces of the inner housing and the first bristle layer may be greater than a collective surface area of the downstream inner chamber opening. The arrangement may provide reduced wear between the bristle layer and the inner housing. In particular, the arrangement may provide reduced fretting wear between the bristle layer and the inner housing. By maximising the surface of the inner housing in contact with the bristle layer, the contact surface between the inner housing and the bristle layer may be increased so that the contact pressure may be reduced.

It will be appreciated that the majority (e.g., at least 30% of the length) of the bristle layer along the second radial contact line may be, in use, maintained in contact with and supported by two or more upstream facing contact surfaces of the inner housing. In further examples, between about 30% and about 100% of the bristle layer along the radial contact line may be, in use, maintained in contact with and supported by two or more upstream facing contact surfaces of the inner housing. In yet further examples, between about 40% and about 100% of the bristle layer along the radial contact line may be, in use, maintained in contact with and supported by two or more upstream facing contact surfaces of the inner housing. In yet further examples, between about 50% and about 100% of the bristle layer along the radial contact line may be, in use, maintained in contact with and supported by one or more upstream facing contact surfaces of the inner housing. In further examples, about 60%, about 70%, about 80% or about 90% of the bristle layer along the radial contact line may be, in use, maintained in contact with and supported by two or more upstream facing contact surfaces of the inner housing. Thus, it will be appreciated that the one or more contact surfaces of the inner housing may be a plain or a pressure-balanced inner housing. The pressure-balanced inner housing may be supplied with a pressurised fluid, or may rely on leakage of pressurised fluid through the bristles, from the upstream region.

The second downstream outer contact member and second downstream facing outer contact surface may be configured, and radially spaced from a radially outward facing end wall of the inner housing, along the first radial contact line. The second downstream outer contact member and second downstream facing outer contact surface may at least partially define and separate a first downstream inner chamber opening of a first downstream inner chamber and a second downstream inner chamber opening of a second downstream inner chamber.

Alternatively, the inner housing may comprise a third or further downstream outer contact member comprising a third or further downstream facing outer contact surface configured along the first radial contact line. The third or further downstream facing outer contact surface may be both configured between and radially displaced along the first radial contact line from the first downstream facing outer contact surface and the second downstream facing outer contact surface to at least partially define either or both of a first downstream inner chamber opening of a first downstream inner chamber and a third or further downstream inner chamber opening of a third or further downstream inner chamber. The third or further downstream facing outer contact surface may at least partially define a third or further downstream inner chamber opening of a third of further downstream chamber. Additionally, the inner housing may comprise a fourth or further downstream outer contact member comprising a fourth or further downstream facing outer contact surface configured along the first radial contact line. The fourth or further downstream facing outer contact surface may be both configured between and radially displaced along the first radial contact line from the third downstream facing outer contact surface and the second downstream facing outer contact surface to at least partially define either or both of a third downstream inner chamber opening of a third downstream inner chamber and a fourth or further downstream inner chamber opening of a fourth or further downstream inner chamber. The fourth or further downstream facing outer contact surface may at least partially define a fourth or further downstream inner chamber opening of a fourth of further downstream chamber. By adding one or more further contact surfaces in conjunction with the second chamber, sufficient pressure balancing of the inner housing may be achieved, whilst optimising the surface of outer housing in contact with the inner housing. Thus, additional contact surface may be achieved, whilst still maintaining a low contact force to reduce the contact pressure of the respective inner housing against the outer housing.

The second contact member may comprise a first downstream inner passageway configured to fluidly connect either the second downstream inner chamber and the first downstream inner chamber or the second downstream inner chamber and the third or further downstream inner chamber. Thus, where the inner housing comprises a first contact member and a second contact member only, the first downstream inner passageway may provide fluid communication, in use, between the second downstream inner chamber and the first downstream inner chamber. By supplying a pressurised fluid to, and pressurising the second downstream inner chamber, pressurised fluid may be further communicated to the first downstream inner chamber. Alternatively, by supplying a pressurised fluid to, and pressurising the first downstream inner chamber, pressurised fluid may be further communicated to the second downstream inner chamber.

The third downstream outer contact member may comprise a second downstream inner passageway configured to fluidly connect at least the third downstream inner chamber and the first downstream inner chamber. Thus, the first downstream inner passageway may provide fluid communication, in use, between the second downstream inner chamber and the third or further downstream inner chamber. Thus, the first chamber, third chamber, and the second chamber may be fluidly connected by the respective second passageway and the first passageway, at least. By supplying a pressurised fluid to, and pressurising the second downstream inner chamber, pressurised fluid may be further communicated to the third downstream inner chamber. Furthermore, by supplying a pressurised fluid to, and pressurising the third downstream inner chamber, pressurised fluid may be further communicated to the first downstream inner chamber.

The first downstream inner passageway may be configured so as to fluidly connect a source of pressurised fluid and either the second downstream inner chamber and the first downstream inner chamber, or the second downstream inner chamber and the third downstream inner chamber. Thus, for example, where the inner housing comprises a fourth contact member, the first downstream inner passageway may be configured so as to fluidly connect a source of pressurised fluid and the second downstream inner chamber with a fourth downstream inner chamber. The second downstream inner passageway, where present, may be configured to fluidly connect the source of pressurised fluid and at least the third downstream inner chamber and the first downstream inner chamber. Thus, by supplying the pressurised fluid to, and pressurising the third or further downstream inner chambers via the first downstream inner passageway, pressurised fluid may be further communicated to the first downstream inner chamber via the second downstream inner passageway. The source of pressurised fluid may be located in a preferential axially upstream position to supply the pressurised fluid to one or more of the first downstream inner chamber, the second downstream inner chamber, and the third downstream inner chamber at a desired pressure.

Additionally or alternatively, the source of pressurised fluid may be discrete from the axial fluid flow upstream of the brush seal, and the pressurised fluid may be sourced from either a further location within the engine, or a means for pressurising fluid. In some examples, the third downstream inner chamber may be the sole chamber fed by the source of pressurised fluid. In some examples, one or more chambers may be fed with the pressurised fluid sourced from the axial fluid flow upstream of the brush seal. Additionally or alternatively, one or more chambers may be fed with the pressurised fluid sourced from the further location within the engine, or the means for pressurising fluid.

In some examples, pressurised fluid may be supplied through holes in the inner housing. Such holes may directly connect the upstream region to the or each downstream inner chamber of the outer housing. Additionally or alternatively, holes in the inner housing may connect the fluid zone upstream of the first bristle layer with the or each downstream inner chamber of the outer housing via the first bristle layer. The holes may be used, in conjunction with other pressurisation means already described, to allow high pressure fluid to back pressure the or each downstream inner chamber The pressurised fluid may pressurise one or more of the downstream inner chambers, in use, to a pressure higher than that of the pressure of the relatively lower fluid pressure region. The pressurised fluid may pressurise one or more of the downstream inner chambers, in use, to a pressure substantially equal to or less than that of the pressure of the relatively higher fluid pressure region. The pressurised fluid may pressurise one or more of the downstream inner chambers, in use, to a pressure substantially equal to or greater than that of the pressure of the relatively higher fluid pressure region. Alternatively, the pressurised fluid may pressurise one or more of the respective downstream inner chambers, in use, to a pressure substantially equal to or greater than that of the pressure of the relatively higher fluid pressure region. The pressurised fluid, in use, may at least partially react axially applied forces on the inner housing against the outer housing. Thus, the pressure within either or both of the first downstream inner chamber and the second downstream inner chamber may infer the reaction force applied to the inner housing.

Each downstream outer contact member may comprise an intrinsic or extrinsic axially extending portion upstanding from a face of the inner housing. Thus, one or more axially extending portions may be integrally formed with the inner housing, forming an inner housing of unitary construction. Thus, one or more upstream inner chambers may be formed by machining a recess between the or each respective contact member, cast, or formed as a unitary body. Thus, at least a portion of either or both of the inner housing or outer housing may be manufactured using 3D printing or additive manufacturing methods. Such arrangements may, for example, allow one or more of the passageways to be added to one or more of the respective downstream outer contact members during manufacture. Additionally or alternatively, one or more axially extending portions may be added during manufacture to the inner body, forming an inner body of two or more part construction. Such extending portions may be added during manufacture by traditional or non-traditional forms of manufacture, including for example welding, brazing, bonding, or diffusion bonding. Bonding may refer to the use of adhesives. Such arrangements may, for example, allow one or more of the passageways to be added to one or more of the respective downstream outer contact members before being added to the inner body during manufacture. Such construction processes may be simpler and cheaper than such one-part or unitary construction processes.

One or more of the downstream outer contact members may comprise an axially extending flange upstanding from the face of the inner housing which engages the outer housing. In this way, the flange may be shaped or formed according to specific requirements. Thus, the or each downstream outer contact surface may be shaped, or modified as required.

A passageway axis of the first downstream inner passageway may extend in a direction at least substantially parallel to the first radial contact line. Thus, one or more passageway axes of the one or more first downstream inner passageways may extend in a direction at least substantially parallel to the first radial contact line. Additionally or alternatively, a passageway axis of the second downstream inner passageway may extend in a direction at least substantially parallel to the first radial contact line. Thus, one or more passageway axes of the one or more second downstream inner passageways may extend in a direction at least substantially parallel to the first radial contact line. Thus, a passageway axis of the or each respective first or second downstream inner passageway may extend in a direction at least substantially parallel to the first radial contact line. By at least substantially parallel, it is meant that the direction is, or is close to being, parallel to the first radial contact line of the first radial-azimuthal contact plane.

A passageway axis of the first downstream inner passageway may extend in a direction which is canted in a circumferential direction away from the first radial contact line. Thus, one or more passageway axes of the one or more first downstream inner passageways may extend in a direction which is canted away from the first radial contact line. Additionally or alternatively, a passageway axis of the second downstream inner passageway may extend in a direction which is canted away from the first radial contact line. Thus, in some examples, one or more passageway axes of the one or more second downstream inner passageways may extend in a direction which is canted away from the first radial contact line on the first radial-azimuthal contact plane. Thus, in some examples, a passageway axis of the or each respective first or second downstream inner passageway may extend in a direction which is canted away from the first radial contact line. In some examples, the or each first downstream inner passageway axis may extend at an angle between about 0° to about 75° relative to the first radial contact line. In further examples, the or each first downstream inner passageway axis may extend at an angle between about 0° to about 60° relative to the first radial contact line. In yet further examples, the or each first downstream inner passageway axis may extend at an angle between about 0° to about 45° relative to the first radial contact line.

In some examples, the respective bristles may extend at an angle between about 10° to about 70° relative to the second radial contact line when the bristles are nominally undeflected. In further examples, the respective bristles may extend at an angle between about 15° to about 65° relative to the second radial contact line when the bristles are nominally undeflected. In yet further examples, the respective bristles may extend at an angle between about 20° to about 60° relative to the second radial contact line when the bristles are nominally undeflected. In yet further examples, the respective bristles may extend at an angle between about 30° to about 55° relative to the second radial contact line when the bristles are nominally undeflected. The respective bristles, when the bristles are nominally undeflected, may extend at an angle which is about 90° to the passageway axis.

The first downstream inner passageway may be formed within a portion of the inner housing. Thus, one or more of the first downstream inner passageways may be formed within a portion of the inner housing. Additionally or alternatively, the second passageway may be formed within a portion of the inner housing. Thus, one or more of the second passageways may be formed within a portion of the inner housing. Thus, one or more of the first or second passageways may be formed within a portion of the inner housing. In forming the one or more passageways within a portion of the inner housing, the possibility of the outer housing becoming caught by the individual passageways is at least partially reduced. Furthermore, the contact area between the inner housing and the outer housing is maximised so as to reduce load. In some examples, the first downstream inner passageway may be formed by drilling holes radially inwards through a portion of the inner housing. The holes may be left free flowing, or may be blocked off at a radially inner or radially outer location within the passageway. The inner housing may also be formed using a multi-part construction process, with subsequent formation of the two or more parts.

The first downstream inner passageway may be formed upon a portion of the inner housing. Thus, one or more of the first passageways may be formed upon a portion of the inner housing. Additionally or alternatively, the second passageway may be formed upon a portion of the inner housing. Thus, one or more of the second passageways may be formed upon a portion of the inner housing. Thus, one or more of the first or second passageways may be formed upon a portion of the inner housing. Furthermore, fluid in the passageways passing between the first chamber and the second chamber may aid in reacting axial forces on the inner housing. Thus, the size of the chambers may be reduced accordingly.

The inner housing and the outer housing may be annular and the first downstream facing outer contact surface and the second downstream facing outer contact surface may each define a circumferential region. The or each of the first downstream inner chamber and second downstream inner chamber may be annular, the or each chamber defining a circumferential region. Thus, the or each of the first downstream inner chamber and second downstream inner chamber may extend entirely around the axis of the engine, forming one or more respective continuous chambers.

One or more of the respective upstream facing or downstream facing inner or outer contact surfaces may comprise a hardened surface layer which is relatively harder than a further portion of the inner housing spaced from the or each contact surface. Additionally or alternatively, one or more of the respective upstream facing or downstream facing inner or outer contact surfaces of the inner or outer housing may comprise a surface layer which comprises either or both of a relatively lower surface roughness and a relatively lower frictional coefficient than a further portion of the inner housing spaced from the or each contact surface. The or each upstream facing or downstream facing inner or outer contact surface of the respective inner or outer housing may comprise a diamond-like-carbon coating. The or each upstream facing or downstream facing inner or outer contact surface of the respective inner or outer housing may comprise an oxidised surface layer. The or each upstream facing or downstream facing inner or outer contact surface of the respective inner or outer housing may comprise a wear resistant surface layer which is relatively more wear resistant than a further portion of the inner housing spaced from the or each contact surface. Such a surface layer may be deposited by one or more of electro-deposition, electro-coating, sputtering, physical vapour deposition or chemical vapour deposition.

The seal arrangement may comprise an anti-rotation feature configured between the inner housing and the outer housing to at least substantially prevent circumferential rotation of the inner housing relative to the outer housing. Thus, the anti-rotation feature may at least substantially prevent the inner housing and brush pack from being rotated by the rotating shaft inside the outer housing. The anti-rotation feature may also allow the radial movement of the inner housing and brush pack relative to the outer housing. Thus, the anti-rotation feature may allow radial movement whilst preventing azimuthal or circumferential movement such that axial movement may be prevented by the outer housing geometry. Furthermore, the anti-rotation means may also act as a biasing or centring device. This may aid in the fitment of the seal into gas turbine engines, especially in horizontal axis build configurations, as gravity does not have the effect of dropping the inner housing to the bottom of the slot. Configurations which may be employed in such configurations may include, for example, pins in slots, radial springs, and wave springs around the outer circumference of the inner housing.

According to a second aspect, there is provided a gas turbine engine comprising the brush seal as described in relation to the first aspect.

According to a third aspect, there is provided a method for sealing a leakage gap between relatively movable parts in an axial flow path between a relatively higher fluid pressure region and a relatively lower fluid pressure region. The method may comprise, configuring an inner housing and an outer housing of the type described in the first aspect between the relatively higher fluid pressure region and the relatively lower fluid pressure region. The method may comprise supplying one or more of the first downstream inner chamber and the second downstream inner chamber with a pressurised fluid to at least partially react axially applied forces on the inner housing against the outer housing.

According to a fourth aspect, there is provided a brush seal as described in relation to the first, second, or third aspect for sealing, in use, a leakage gap between relatively movable parts in an axial flow path between a relatively higher fluid pressure region and a relatively lower fluid pressure region. The brush seal may further comprise an inner housing comprising a first central inner contact member and a second central inner contact member. A first of the central inner contact members may comprise a first upstream facing inner contact surface. A second of the contact members may comprise a second upstream facing contact surface. The second upstream facing inner contact surface may be both distinct from and radially displaced from the first upstream facing inner contact surface along a second radial contact line to define one or more central inner chamber openings of one or more central inner chambers therebetween. The brush seal may further comprise a first bristle layer in physical communication with both the first upstream facing inner contact surface and the second upstream facing inner contact surface along the second radial contact line. The first bristle layer may be configured in use between the high pressure region and the inner housing. Resolved adjacent to the second radial contact line, a collective contact surface of the inner housing between the first bristle layer and each of the respective upstream facing inner contact surfaces may be greater than a collective surface of the or each respective chamber opening. The arrangement may provide reduced wear between the bristle layer and the inner housing. In particular, the arrangement provides reduced fretting wear between the bristle layer and the inner housing. By maximising the surface of inner housing in contact with the bristle layer, the contact surface between the inner housing and the bristle layer may be increased so that the contact pressure may be reduced.

According to a fifth aspect, there is provided a gas turbine engine for an aircraft comprising an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft, wherein: the gas turbine engine comprises a brush seal as provided in any other aspect.

The turbine may be a first turbine, the compressor may be a first compressor, and the core shaft may be a first core shaft. The engine core further may comprise a second turbine, a second compressor, and a second core shaft connecting the second turbine to the second compressor. The second turbine, second compressor, and second core shaft may be arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge.

The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$.

The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance-between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

A first central inner passageway may extend between a second central inner chamber and a second central inner chamber, or a second central inner chamber and a third or further central inner chamber. A second central inner passageway may extend between a third or further central inner chamber and a first central inner chamber. Thus, a passageway axis of a first central inner passageway may extend in a direction at least substantially parallel to the second radial contact line. Thus, one or more passageway axes of one or more first central inner passageways may extend in a direction at least substantially parallel to the second radial contact line. Additionally or alternatively, a passageway axis of the second central inner passageway may extend in a direction at least substantially parallel to the second radial contact line. Thus, one or more passageway axes of the one or more second central inner passageways may extend in a direction at least substantially parallel to the second radial contact line. Thus, a passageway axis of the or each respective first or second central inner passageway may extend in a direction at least substantially parallel to the second radial contact line. By at least substantially parallel, it is meant that the direction is, or is close to being, parallel to the second radial contact line of the second radial-azimuthal contact plane.

A passageway axis of the first central inner passageway may extend in a direction which is canted in a circumferential direction away from the second radial contact line. Thus, one or more passageway axes of the one or more first central inner passageways may extend in a direction which is canted away from the second radial contact line. Additionally or alternatively, a passageway axis of the second central inner passageway may extend in a direction which is canted away from the second radial contact line on the second radial-azimuthal contact plane. Thus, in some examples, one or more passageway axes of the one or more second central inner passageways may extend in a direction which is canted away from the second radial contact line. Thus, in some examples, a passageway axis of the or each respective first or second central inner passageway may extend in a direction which is canted away from the second radial contact line. Thus, in canting the one or more of either or both of the first and second central inner passageways away from the second radial contact line opposite to the lay angle of the bristles, there is a reduced likelihood of individual bristles becoming caught within the individual passageways. In some examples, the or each first central inner passageway axis may extend at an angle between about 0° to about 75° relative to the second radial contact line. In further examples, the or each first central inner passageway axis may extend at an angle between about 30° to about 70° relative to the second radial contact line. In yet further examples, the or each first central inner passageway axis may extend at an angle between about 45° to about 60° relative to the second radial contact line.

In further examples, either or both of one or more first downstream inner passageways and one or more second or further downstream inner passageways may be formed into the upstream facing surface of the downstream radial wall of the outer housing. Additionally or alternatively, either or both of one or more first downstream inner passageways and one or more second or further downstream inner passageways may be formed within or through the downstream radial wall of the outer housing. In this way, the arrangement may reduce manufacturing complexity of the inner housing.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which:

FIG. 5b shows a rear view of the arrangement described in FIG. 5a;

FIG. 6b shows a rear view of the arrangement described in FIG. 6a;

FIG. 7b shows a rear view of the arrangement described in FIG. 7a;

FIG. 8b shows a rear view of the arrangement described in FIG. 8a;

DETAILED DESCRIPTION OF THE DISCLOSURE

Figure 1:
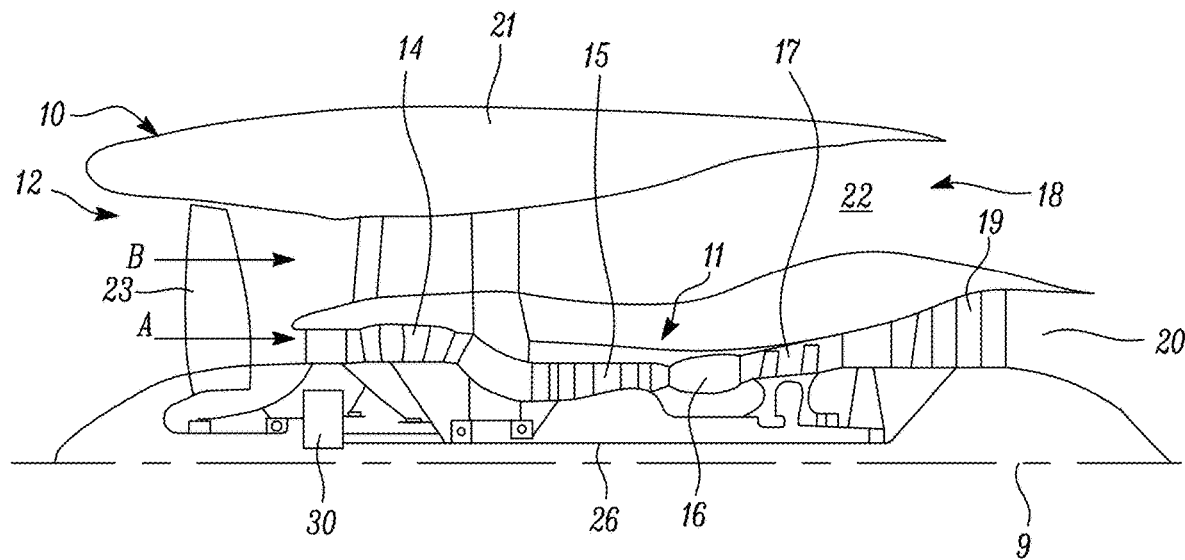
FIG. 1 shows a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
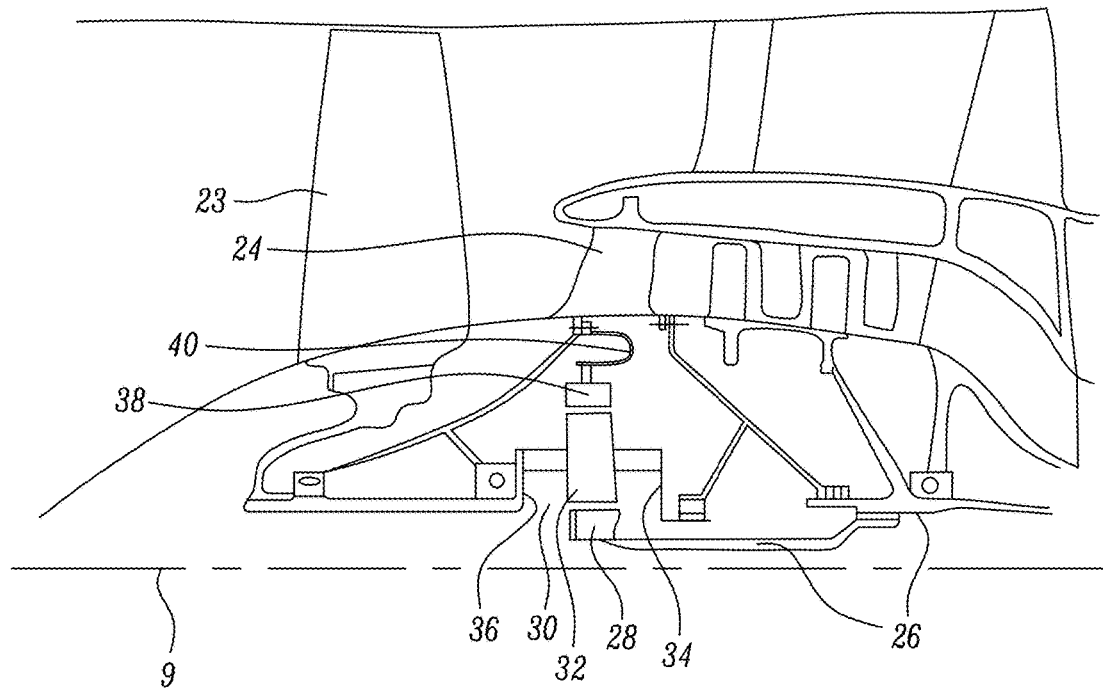
FIG. 2 shows a mechanical arrangement for a geared fan gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
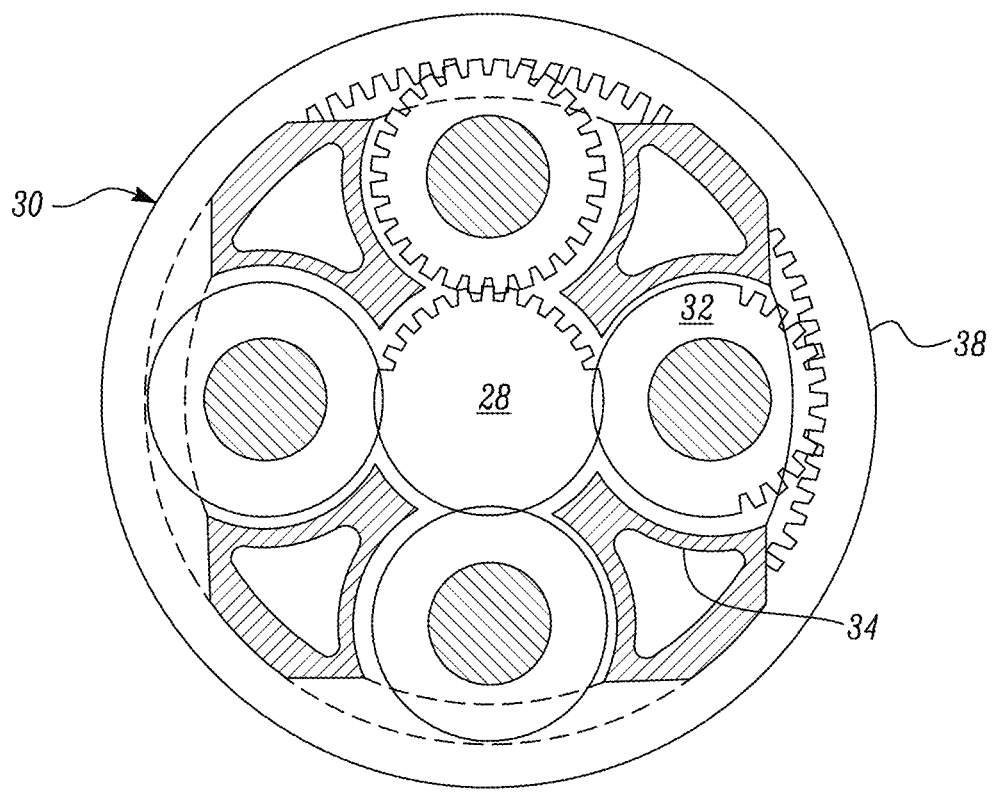
FIG. 3 shows an arrangement of an epicyclic gearbox.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4A:
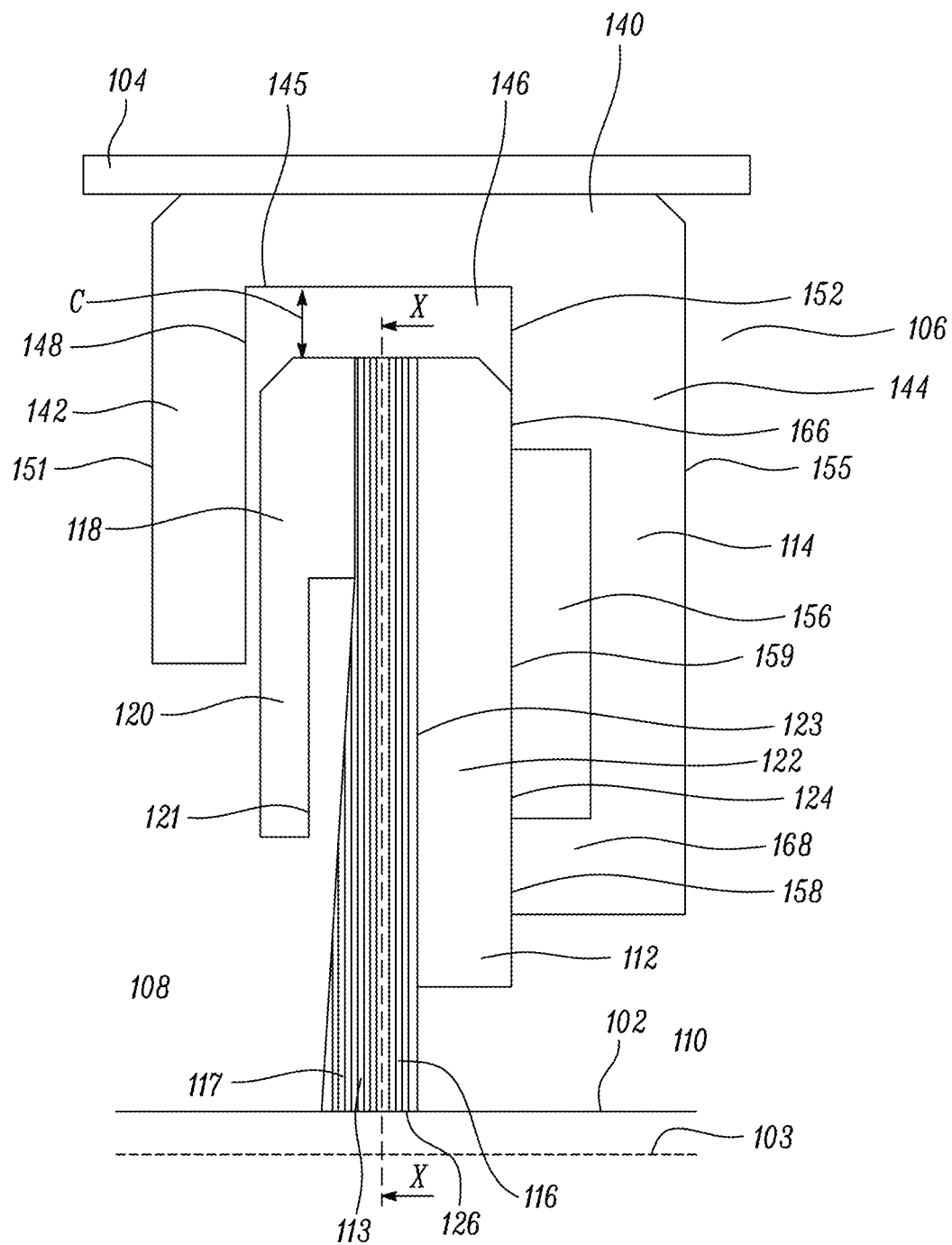
FIG. 4a shows a cross-sectional view of a brush seal arrangement.

FIG. 4a shows a known arrangement described in granted European Patent EP1653129, showing a cross-section through part of a gas turbine engine, in which a rotatable shaft 102, with axis 103, is mounted, within a static, concentric, casing 104. The annular gap between shaft 102 and casing 104 is closed by a compliant seal 106, which seals a first, upstream region 108 from a second, downstream region 110. During operation of the gas turbine engine, air in the first upstream region 108 is pressurised to a relatively higher pressure than air in the low pressure downstream region 110. The brush seal 106 isolates the regions 108,110 from one another. The brush seal 106 comprises a seal pack 112 slidably mounted within an annular seal pack carrier 114. The seal pack 112 comprises a compliant annulus 113, which comprises a dense annular array of bristles 116, known as a bristle pack 117, bound about its external circumference by a retaining member 118. The seal pack 112 further comprises an upstream annular cover plate 120 which comprises a downstream facing surface 121 of the seal pack 112, and a downstream annular backing member 122, which forms an upstream facing surface 123 of the seal pack 112.

The seal pack carrier 114 comprises an annular retaining wall 140, first upstream radial wall 142, and second downstream radial wall 144. The retaining wall 140 is attached to the engine casing 104, and comprises an annular clearance C between the seal pack 112 and the annular retaining wall 140. This clearance C accommodates the radial movement of the seal pack 112. It is sized to accommodate the maximum eccentric excursion between shaft 102 and engine casing 104 during engine operation, and the maximum radial growth of the seal pack 112 relative to the carrier 114. The radial walls 142,144 project radially inwards from, respectively, the upstream and downstream ends of the retaining wall 140, in spaced apart arrangement, to define an annular slot 146, open radially inwards of the retaining wall 140. The slot's upstream surface 148 is formed by the downstream facing surface of the first upstream radial wall 142, which extends radially inwards to an internal diameter. The upstream facing surface of the same radial wall 142 forms the external, upstream face 151 of the carrier 114. The slot's downstream surface is formed by the upstream facing surface 152 of the second radial wall 144, which extends radially inwards to an internal diameter, and which defines an annular clearance about the engine shaft 102. The downstream facing surface 155 of the wall 144 defines the downstream face of the carrier 114.

An annular chamber 156 is formed in the upstream facing surface 152 of the second downstream radial wall 144, bound at its outboard circumference by a second upstream facing contact surface 166, and at its inner radius by a first upstream facing annular contact member 168 defining a first upstream facing contact surface 158. The first upstream facing contact surface 158 of the downstream radial wall 144 is both distinct from and radially displaced from the second upstream facing contact surface 166 of the downstream radial wall 144 along a radial contact line on the downstream radial-azimuthal contact plane to define a first downstream chamber opening 159 therebetween. In particular, a collective contact surface adjacent to the radial contact line between the downstream surface 124 of the seal pack 112 and both the first upstream facing contact surface 158 and the second upstream facing contact surface 166 is less than a collective surface adjacent to the radial contact line of the downstream outer chamber opening 159 in order to maximise the pressure-balancing of the arrangement.

Figure 5A:
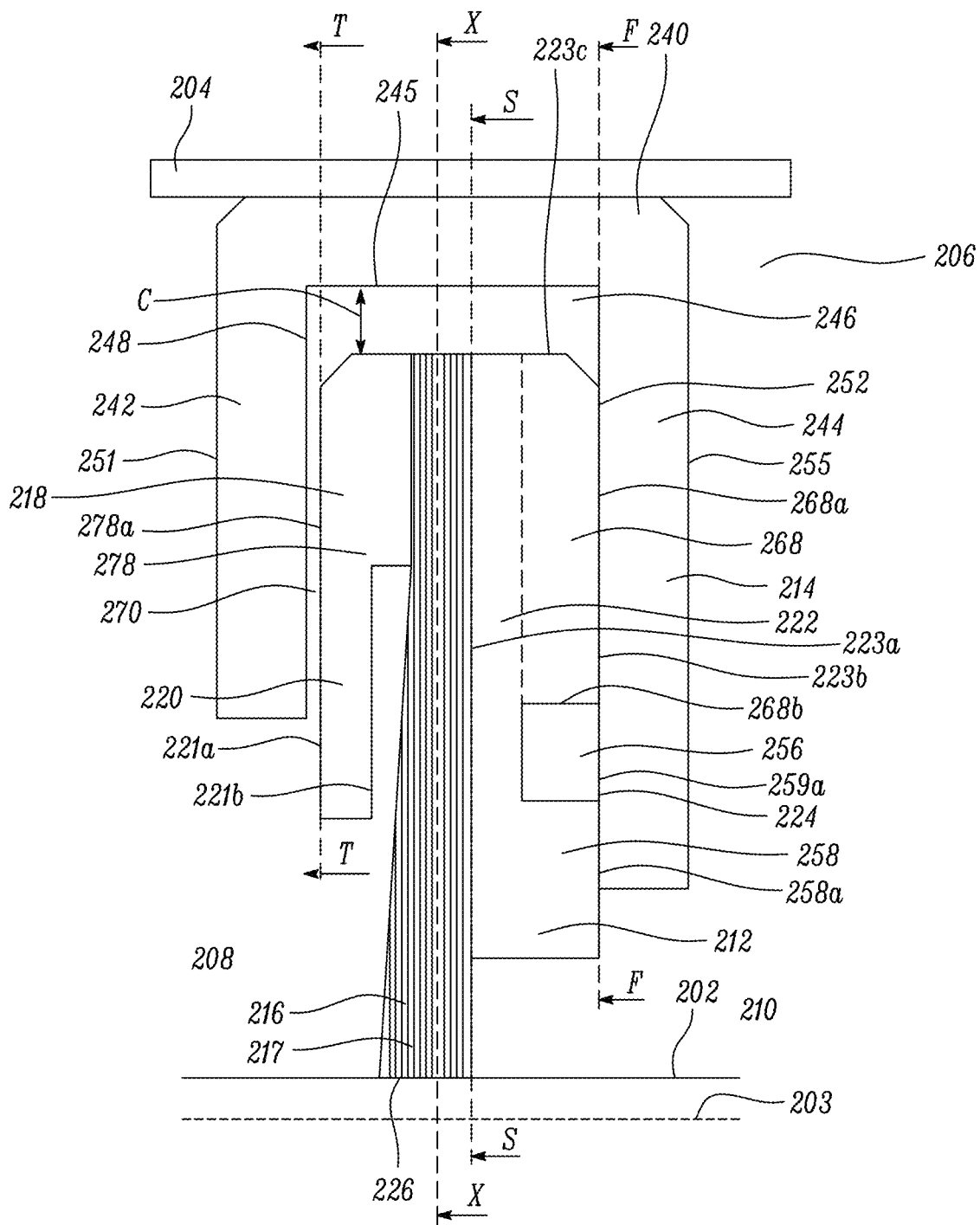
FIG. 5a shows a cross-sectional view of a brush seal arrangement of the present disclosure.

FIG. 5a shows an arrangement according to the present invention, showing a cross-section through part of a gas turbine engine, in which a rotatable shaft 202, with axis of rotation 203, is mounted, within a static, concentric, casing 204. The annular gap between shaft 202 and casing 204 is closed by a compliant seal 206, which seals a first, high fluid pressure upstream region 208 from a second, downstream relatively lower fluid pressure region 210. During operation of the gas turbine engine, air in the first upstream region 208 is pressurised to a relatively higher pressure than air in the low pressure downstream region 210. The brush seal 206 isolates the regions 208,210 from one another. The brush seal 206 comprises a seal pack forming an inner housing 212 slidably mounted within an annular seal pack carrier forming an outer housing 214. Thus, the inner housing 212 is located at least partially within and configured for radial displacement relative to both the outer housing 214 and either or both of the axial flow path and the axis of rotation 203. In some examples, the inner housing 212 is slidably mounted within the outer housing 214 with only frictional engagement between the facing surfaces of the inner housing 212 and the outer housing 214. With slidable mounting of the inner housing 212 and brush relative to the outer housing 214, the brush seal 206 can slide when the bristle loads become higher than a threshold value. This threshold value is generally a function of the differential pressure across the brush seal 206 for a given brush pack. The working of this has been published in GT2012-68891, Franceschini G, Jones T. V, Gillespie D. R. H. "The Development of a Large Radial Movement Brush Seal", ASME Gas Turbine and Aeroengine Congress, Copenhagen, Denmark, June 2012, the teaching of which is hereby incorporated by reference.

The inner housing 212 comprises a compliant annulus, which comprises a dense annular array of bristles, configured as a bristle pack 216, or more specifically as a first bristle layer 217, bound about its external circumference by a retaining member 218. The inner housing 212 comprises an upstream annular cover plate 220 comprising an upstream facing surface 221a and a downstream facing surface 221b. The inner housing 212 further comprises a downstream annular backing member 222 comprising an upstream facing surface 223a and a downstream facing surface 223b, along with a radially outward facing end wall 223c. As shown, the first bristle layer 217 is in physical communication with at least a first upstream facing inner contact surface, shown in the specific example of FIG. 5a as the upstream facing surface 223a, configured along a second radial contact line S-S. The second radial contact line S-S may extend along a second radial-azimuthal contact plane. The second radial contact line S-S may refer to a second radial line extending parallel to the second radial-azimuthal contact plane. Along the second radial contact line S-S, bristles, forming part of the bristle pack 216, are arranged to point inwards from this retaining member 218 to form a sealing face 226 at their internal diameter. The bristles are inclined at a lay angle to the radial direction such that each bristle 216, at its radially inner end, lays adjacent to the surface of the shaft 202. The cover plate 220 is axially spaced from the bristle pack 216. The cover plate 220 extends radially inwards such that an annular gap is defined between the cover plate 220 and the sealing face 226. The downstream annular backing member 222 extends radially inwards from the retaining member 218 such that annular gap is defined between the downstream annular backing member 222 and the sealing face 226, the gap being sized to accommodate the maximum likely deflection of the sealing face 226 through radial growth of the shaft 202 relative to the seal during engine operation. In the example shown, the downstream annular backing member 222 supports the downstream face of the bristle pack 216 over the entire length of the downstream annular backing member 222.

The seal outer housing 214 comprises an annular retaining wall 240 comprising a radially inward facing surface 245, an upstream radial wall 242, and a downstream radial wall 244. The retaining wall 240 is attached to the engine casing 204, and comprises an annular clearance C between the inner housing 212 and the radially inward facing surface 245 of the outer housing 214. Clearance C accommodates the radial movement of the seal pack 212 relative to the outer housing 214. Clearance C is sized to accommodate the maximum eccentric excursion between shaft 202 and engine casing 204 during engine operation, and the maximum radial growth of the seal pack 212 relative to the outer housing 214. The axially spaced radial walls 242,244 project radially inwards from, respectively, the upstream and downstream ends of the retaining wall 240.

The upstream radial wall 242 of the outer housing 214 comprises an upstream facing outer surface 251 and a downstream facing inner surface 248. The downstream radial wall 244 of the outer housing 214 further comprises an upstream facing inner surface 252 and a downstream facing outer surface 255. Thus, the upstream inner surface of the outer housing 214 is formed by the downstream facing surface 248 of the upstream radial wall 242. Furthermore, the downstream inner surface of the outer housing 214 is formed by the upstream facing surface 252 of the downstream radial wall 244. It will be appreciated that in further examples, the outer housing 214 may comprise one or more contact members (not shown) comprising one or more contact surfaces, and where applicable, one or more chambers therebetween. For example, although not shown, the outer housing 214 may comprise a first downstream outer contact member defining a first upstream facing outer contact surface, and a second downstream outer contact member defining a second upstream facing outer contact surface. The upstream inner surface 248 and the downstream inner surface 252 of the respective radial walls 242,244 form the internally facing surfaces of a slot within which the inner housing 212 is slidably configured.

The annular backing member 222 comprises a first downstream facing outer contact member, termed the first downstream outer contact member 258, defining a first downstream facing outer contact surface 258a, and a second downstream facing outer contact member termed the second downstream outer contact member 268 defining a second downstream facing outer contact surface 268a. In some examples, the first downstream outer contact member 258 and the second downstream outer contact member 268 may be annular. Thus, in some examples, the first downstream facing outer contact surface 258a and the second downstream facing outer contact surface 268a may be annular. A first downstream inner chamber 256 is formed in the downstream facing surface 223b of the annular backing member 222, bound at its inner radius by the first downstream outer contact member 258 defining the first downstream facing outer contact surface 258a, and at its outboard circumference by the second downstream outer contact member 268 defining the second downstream facing outer contact surface 268a. In some examples, the first downstream inner chamber 256 may be annular. Both the first downstream facing outer contact surface 258a and the second downstream facing outer contact surface 268a are configured along a first radial contact line F-F. The first radial contact line F-F may extend along a first radial-azimuthal contact plane. The first radial contact line F-F may refer to a first radial line extending parallel to the first radial-azimuthal contact plane. The first downstream facing outer contact surface 258a is both distinct from and radially spaced from the second downstream facing outer contact surface 268a along the first radial contact line F-F to define a first downstream inner chamber opening 259a therebetween.

As shown in FIG. 5a, the second downstream outer contact member 268, which defines the second downstream facing outer contact surface 268a extends partly along the annular backing member 222. In particular, the second downstream outer contact member 268 extends between the first downstream inner chamber 256 and the radially outward facing end wall 223c. Thus, the second downstream outer contact member 268 comprises a second radially inner endwall 268b which partly defines a radially outer surface of the first downstream inner chamber 256.

The upstream facing inner surface 252 of the outer housing 214 is maintained in physical communication with at least the first downstream facing outer contact surface 258a and at least a portion of the second downstream facing outer contact surface 268a during all relative radial displacements therebetween, which are expected to arise during normal use. Thus, the values of clearance C may vary to accommodate either or both of the maximum eccentric excursion between shaft 202 and engine casing 204 during normal engine operation, and the maximum radial growth of the seal pack 212 relative to the outer housing 214. Thus, at all relative radial positions of the inner housing 212 relative to the outer housing 214 expected during normal use, a collective contact surface along the first radial contact line F-F between the inner housing 212 and the outer housing 214 is greater than a collective surface along the first radial contact line F-F of the downstream inner chamber opening 259a.

Figure 5B:
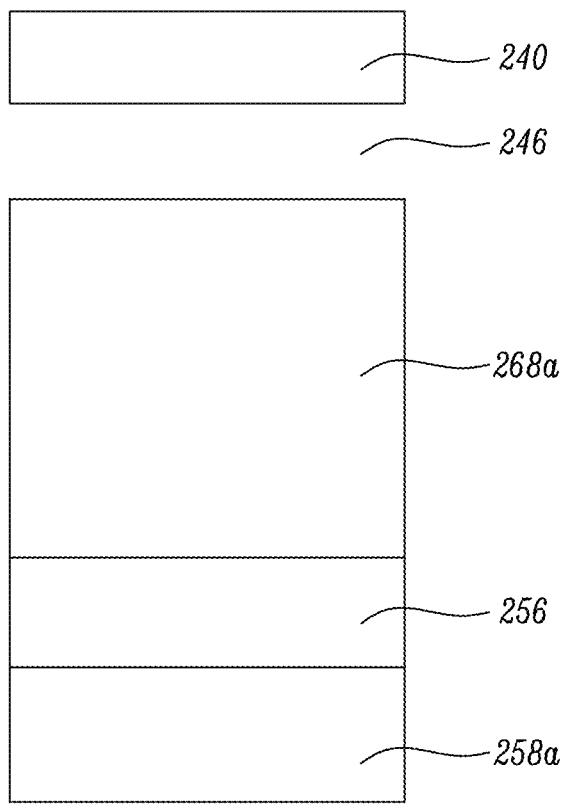

FIG. 5b shows a rear view (viewed from downstream) of the inner housing 212, viewed on the first radial-azimuthal contact plane F-F. The downstream backing member 222 and the second downstream outer contact member 268 extend radially inwards from the radially outward facing end wall 223c. The second downstream outer contact member 268 and the second downstream facing outer contact surface 268a are radially spaced from the first downstream outer contact member 258 and the first downstream facing outer contact surface 258a to define the first downstream inner chamber 256 therebetween. Furthermore, in the example shown, both the first downstream outer contact member 258 defining the first downstream facing outer contact surface 258a and the second downstream outer contact member 268 defining the second downstream facing outer contact surface 268a provide reaction surfaces for the outer housing 214 to support the inner housing 212, during use.

Referring again to FIG. 5a, in the example shown, a radially extending gap 270 exists between the upstream inner surface 248 of the upstream radial wall 242 and the upstream facing surface 221a. In some examples, the radially extending gap 270 may be annular. As shown, the gap extends along the radial length of the upstream radial wall 242 between the second downstream inner chamber 246 and the relatively high fluid pressure upstream region 208. Thus, the second downstream inner chamber 246 is maintained in fluidic communication with the relatively high fluid pressure upstream region 208 to supply the second downstream inner chamber 246 with high pressure fluid. In this way, the inner housing 212 is provided with a radially directed inward force to force the inner housing 212 radially inwards towards the rotatable shaft 202 and maintain an annular clearance C between the inner housing 212 and the outer housing 214. In further examples, the gap 270 may instead be formed into the downstream facing inner surface 248 or the upstream facing surface 221a to provide a channel therein. In further examples, the gap 270 may be formed into the radially inward facing surface 245 of the annular retaining wall 240. In yet further examples, the gap 270 may instead be formed through upstream radial wall 242 or the annular cover plate 220 to provide a channel or orifice therein. In further examples, the gap 270 may be formed through the annular retaining wall 240 to provide a channel or orifice therein. Thus, the gap is configured to transport high pressure fluid between the high fluid pressure upstream region 208 and the second downstream inner chamber 246.

In some examples, the upstream facing surface 221a of the inner housing 212 comprises a first upstream outer contact member 278 comprising a first upstream facing outer surface 278a configured along a third radial contact line T-T. Thus, in some examples, the third radial contact line T-T may extend along a third radial-azimuthal contact plane. The third radial contact line T-T may refer to a third radial line extending parallel to the third radial-azimuthal contact plane. In some examples, at least a portion of the upstream inner surface 248 of the upstream radial wall 242 may be in contact with the first upstream facing outer surface 278a along the third radial contact line T-T. Thus, at least a portion of the upstream inner surface 248 of the upstream radial wall 242 may be, in use, maintained in contact with and axially support the upstream facing outer contact surface 278a of the inner housing 212. In further examples illustrated by FIG. 10, the inner housing 212 may comprise a second upstream outer contact member (located at upstream annular cover plate 220) comprising a second upstream facing outer surface (located at upstream facing surface 221a) configured, and radially spaced from the first upstream facing outer surface, along the third radial contact line T-T to define an upstream inner chamber opening 221c therebetween, which may be supplied with a pressurised fluid of relatively similar or relatively higher pressure than that of the air in the low pressure downstream region 210. Thus, fluid in the first chamber may be vented to the low pressure downstream region 210, such that the inner housing 212 is offloaded axially.

Figure 6A:
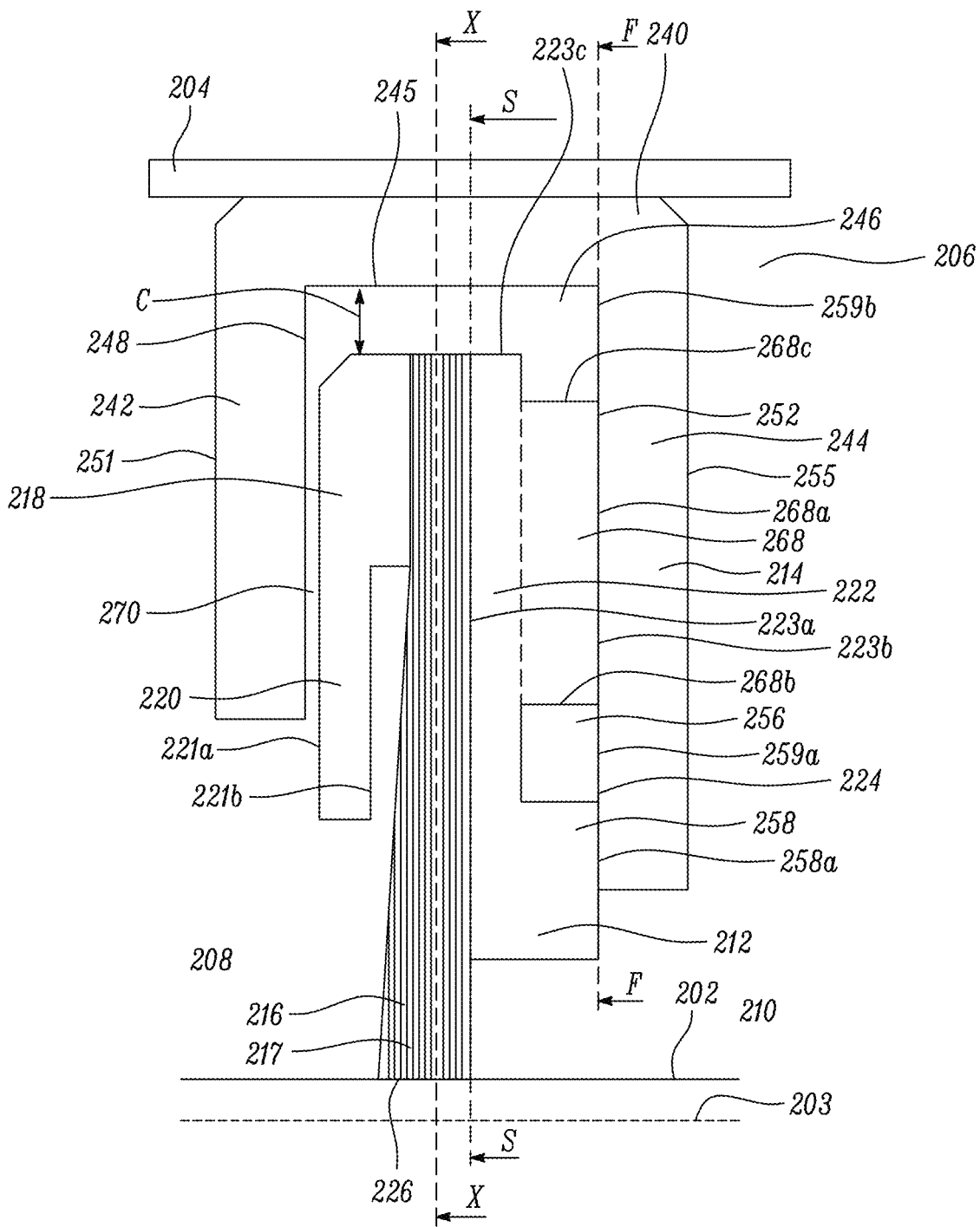
FIG. 6a shows a cross-sectional view of a brush seal arrangement of the present disclosure.
Figure 6B:
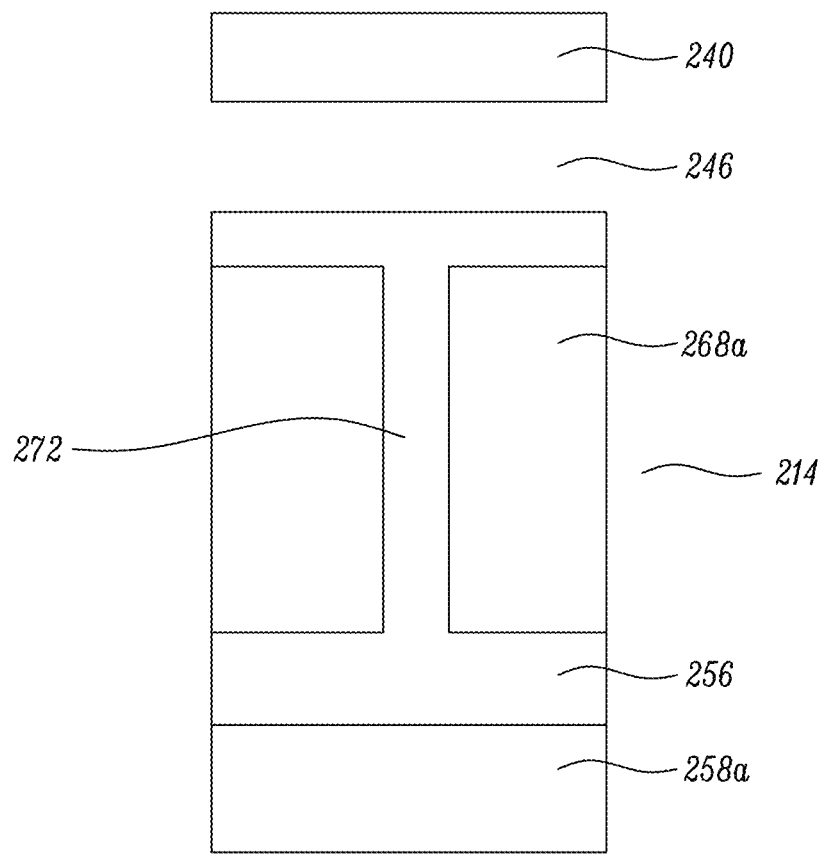

Referring now to FIGS. 6a and 6b, features corresponding to those of FIGS. 5a and 5b, respectively, are given corresponding reference numerals, apart from features which shall now be described. As shown in FIG. 6a, the backing member 222 comprises the first downstream outer contact member 258 defining the first downstream facing outer contact surface 258a, and the second downstream outer contact member 268 defining the second downstream facing outer contact surface 268a. The first downstream inner chamber 256 is formed in the downstream facing surface 223b of the backing member 222, bound at its inner radius by the first downstream outer contact member 258 defining the first downstream facing outer contact surface 258a, and at its outboard circumference by the second downstream outer contact member 268 defining the second downstream facing outer contact surface 268a. As shown and described in relation to FIG. 5a, both the first downstream facing outer contact surface 258a and the second downstream facing outer contact surface 268a are configured along the first radial contact line F-F. The first downstream facing outer contact surface 258a is both distinct from and radially spaced from the second downstream facing outer contact surface 268a along the first radial contact line F-F to define a first downstream inner chamber opening 259a therebetween.

As shown in FIG. 6a, the second downstream outer contact member 268 and second downstream facing outer contact surface 268a are configured, and radially spaced from a radially outward facing end wall 223c of the inner housing 212 to define a second downstream inner chamber 246 therebetween. Furthermore, the second downstream facing outer contact surface 268a is both distinct from and radially spaced from the radially outward facing end wall 223c of the backing member 222 along the first radial contact line F-F to define a second downstream inner chamber opening 259b therebetween. As shown, the second downstream outer contact member 268 comprises a second radially inner endwall 268b which partly defines a radially outer surface of the first downstream inner chamber 256, and a second radially outer endwall 268c which partly defines a radially inner surface of a second downstream inner chamber 246. Accordingly, the second downstream outer contact member 268 at least partially defines and separates a first downstream inner chamber opening 259a of a first downstream inner chamber 256 and a second downstream inner chamber opening 259b of a second downstream inner chamber 246. Thus, in the example shown, the second downstream outer chamber 246 axially extends between the downstream facing inner surface 248 and an upstream facing surface of the downstream radial wall 244. Furthermore, a portion of the second downstream outer chamber 246 radially extends between the radially outer endwall of the downstream annular backing member 223c and the radially inward facing surface 245 of the annular retaining wall 240. Yet further, a portion of the second downstream outer chamber 246 radially extends between the second radially outer endwall 268c of the second downstream outer contact member 268 and the radially inward facing surface 245 of the annular retaining wall 240.

The upstream facing inner surface 252 of the outer housing 214 is maintained in physical communication with at least the first downstream facing outer contact surface 258a and at least a portion of the second downstream facing outer contact surface 268a during all relative radial displacements therebetween, which are expected to arise during normal use. Thus, the values of clearance C may vary to accommodate either or both of the maximum eccentric excursion between shaft 202 and engine casing 204 during normal engine operation, and the maximum radial growth of the seal pack 212 relative to the outer housing 214. Thus, at all relative radial positions of the inner housing 212 relative to the outer housing 214 expected during normal use, a collective contact surface along the first radial contact line F-F between the inner housing 212 and the outer housing 214 is greater than a collective surface along the first radial contact line F-F of the downstream inner chamber opening 259a. In some examples, at all relative radial positions of the inner housing 212 relative to the outer housing 214 expected during normal use, a collective contact surface along the first radial contact line F-F between the inner housing 212 and the outer housing 214 is greater than a collective surface along the first radial contact line F-F of both the downstream inner chamber opening 259a and the second downstream inner chamber opening 259b.

Figure 10:
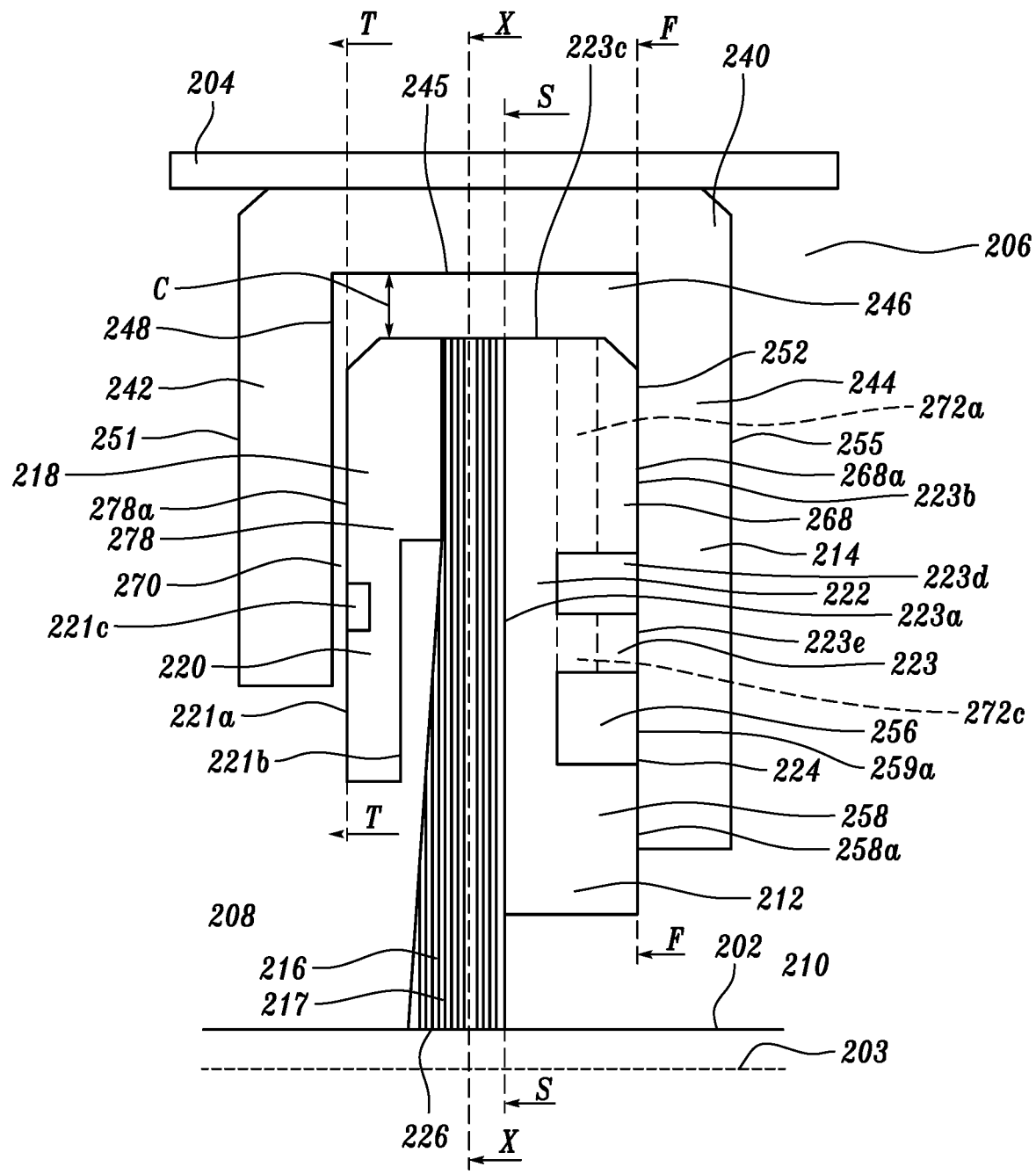
FIGS. 10 and 11 show a cross-sectional view of a brush seal arrangement of the present disclosure.

In further examples in FIG. 10, the inner housing 212 may comprise a third or further downstream outer contact member 223 comprising a third or further downstream facing outer contact surface 223e configured along the first radial contact line F-F. The third or further downstream facing outer contact surface 223e may be both configured between and radially displaced along the first radial contact line F-F from the first downstream facing outer contact surface 258a and the second downstream facing outer contact surface 268a to at least partially define either or both of a first downstream inner chamber opening 259a of a first downstream inner chamber 256 and a third downstream inner chamber opening of a third downstream inner chamber 223d. The third or further downstream facing outer contact surface 223e may at least partially define a third or further downstream inner chamber opening of a third of further downstream chamber 223d.

FIG. 6b shows a rear view (viewed from downstream) of the inner housing 212 previously shown in FIG. 6a, viewed on the first radial-azimuthal contact plane F-F. The backing member 222 extends radially inwards from the radially outward facing end wall 223c. The second downstream outer contact member 268 and the second downstream facing outer contact surface 268a are spaced from, and extend radially inwards relative to the radially outward facing end wall 223c, such that the second downstream inner chamber 246 is defined between the radially outward facing end wall 223c and both the second downstream outer contact member 268 and the second downstream facing outer contact surface 268a. Furthermore, the second downstream outer contact member 268 and the second downstream facing outer contact surface 268a are radially spaced from the first downstream outer contact member 258 and the first downstream facing outer contact surface 258a to define the first downstream inner chamber 256 therebetween. Furthermore, in the example shown, both the first downstream outer contact member 258 defining the first downstream facing outer contact surface 258a and the second downstream outer contact member 268 defining the second downstream facing outer contact surface 268a are axially supported by the upstream facing inner surface 252 of the outer housing 214.

In addition, the second downstream outer contact member 268 in the backing member 222 comprises one or more first downstream inner passageways 272 or channels therein. In particular, the or each first downstream inner passageway 272 may comprise a passageway, recess or groove formed into the second downstream facing outer contact surface 268a. In this way, the first downstream inner passageway 272 is configured to fluidly connect at least the first downstream inner chamber 256 and the second downstream inner chamber. Hence, where applicable, a third or further downstream outer contact member 223 may comprise a second downstream inner passageway 272c configured to fluidly connect at least the third downstream inner chamber and the first downstream inner chamber 256. According to some examples, one or more first downstream inner passageways 272 may comprise a defined diameter or depth. In some examples, the diameter or depth of one or more of the first downstream inner passageways 272 may be between about 20% to about 80% of the axial thickness of the backing member 222. In further examples, the diameter or depth of one or more of the first downstream inner passageways 272 may be between about 40% to about 80% of the axial thickness of the backing member 222. In yet further examples, the diameter or depth of one or more of the first downstream inner passageways 272 may be between about 50% to about 75% of the axial thickness of the backing member 222. In some examples, the first passageways 240 may be provided between pillars, using a deposition or layered construction method. In yet further examples, the axis of the first passageway may extend in a direction which is canted away from the first radial contact line F-F. Thus, the first downstream inner passageway 272 and, where applicable, the second downstream inner passageway may be configured to fluidly connect a source of pressurised fluid and either or both of the first downstream inner chamber 256 and the second downstream inner chamber 246. Thus, the first downstream inner passageway may be configured to fluidly connect a source of pressurised fluid and either the second downstream inner chamber or the first downstream inner chamber. Additionally, the second downstream inner passageway may be configured to fluidly connect a source of pressurised fluid via passageway 272a and at least the third downstream inner chamber and the first downstream inner chamber.

In further examples, the first downstream inner passageway 272 and, where applicable, the second downstream inner passageway may be configured to fluidly connect the first downstream inner chamber 256 and the second downstream inner chamber 246 only, without any further fluid connection to the relatively high fluid pressure upstream region 208, or a further source of pressurised fluid. In yet further examples, the first downstream inner passageway 272 may be configured to fluidly connect the first downstream inner chamber 256 and the third or further downstream inner chamber only, without any further fluid connection to the relatively high fluid pressure upstream region 208, a further source of pressurised fluid, or the second downstream inner chamber 246.

Referring again to FIG. 6a, in the example shown, the radially extending gap 270 extends along the radial length of the upstream radial wall 242 between the second downstream inner chamber 246 and the relatively high fluid pressure upstream region 208. Thus, the second downstream inner chamber 246 is maintained in fluidic communication with the relatively high fluid pressure upstream region 208 in order to supply the second downstream inner chamber 246 with the high pressure fluid. In this way, high pressure fluid may, in use, at least partially react axially applied forces on the inner housing 212 against the outer housing 214.

By means of the first downstream inner passageway 272 as shown in FIG. 6b, during use, high pressure fluid may flow between the second downstream inner chamber 246 and the first downstream inner chamber 256. Thus, high pressure fluid may, in use, at least partially react radially applied forces on the inner housing 212 against the outer housing 214. Thus, by supplying the second downstream inner chamber 246 with high pressure fluid, the high pressure fluid may be transferred to first downstream inner chamber 256 via the first downstream inner passageway 272, and where relevant, the second or further downstream inner passageway, in order to pressurise both the third or further inner chamber and the first downstream inner chamber 256. In some examples, the pressurised fluid may pressurise either or both of the first downstream inner chamber 256 and the second downstream inner chamber 246, in use, to a pressure substantially equal to or less than that of the pressure of the relatively higher pressure upstream region 208, depending on the location of the source of the pressurised fluid. In further examples, the pressurised fluid may pressurise either or both of the first downstream inner chamber 256 and the second downstream inner chamber 246, in use, to a pressure substantially equal to or greater than that of the pressure of the relatively higher pressure upstream region 208, depending on the location of the source of the pressurised fluid. In yet further examples, the pressurised fluid may pressurise either or both of the first downstream inner chamber 256 and the second downstream inner chamber 246, in use, to a pressure higher than that of the pressure of the relatively lower fluid pressure region 210. In all examples, the pressurised fluid refers to a fluid pressurised to a static fluid pressure which is relatively greater than the static fluid pressure of the downstream region. Thus, in some examples, the pressurised fluid refers to a fluid pressurised to a static fluid pressure which is greater than about 1 atm. The quotient of the static pressure above downstream and the differential pressure (upstream above downstream) can be called the pressure balancing ratio. In some examples, the fluid may be pressurised to a pressure balancing ratio between about 0.8 to about 1.1. In further examples, the fluid may be pressurised to a pressure balancing ratio between about 0.9 to about 1.05. In yet further examples, the fluid may be pressurised to a pressure balancing ratio between about 0.95 to about 1.0. In preferred examples, it will be appreciated that the fluid is a gas. The fluid may be a working gas. In most preferred examples, the working gas is air.

The source of pressurised fluid may be provided to either or both of the first downstream inner chamber 256 and the second downstream inner chamber 246 from a location axially upstream of one or more of the first downstream inner passageways 272, outer housing 214, and radially extending gap 270 in fluidic communication with the relatively higher pressure upstream region 208. Furthermore, the fluid pressure in either or both of the first downstream inner chamber 256 and the second downstream inner chamber 246 may be reduced or modified by locating a constant or variable constriction, seal, or valve, for example, in one or more of the radially extending gap 270, the first passageway 272, or the second or further passageway. Such an arrangement may comprise one or more pressure sensors and controllers configured to measure, monitor and control the fluid pressure in either or both of the first downstream inner chamber 256 and the second downstream inner chamber 246. In this way, the fluid pressure in either or both of the first downstream inner chamber 256 and the second downstream inner chamber 246 may be tailored or controlled to enable a balancing of axially applied forces on the inner housing 212 against the outer housing 214. Particular passageway configurations for transferring pressurised fluid to either or both of the first downstream inner chamber 256 and the second downstream inner chamber 246 from the source of pressurised fluid may, in some examples, be equivalent to those described in U.S. Pat. No. 6,173,962, which is hereby incorporated by reference.

As shown in the example of FIGS. 6a and 6b, in use, the pressurised fluid within either or both of the first downstream inner chamber 256 and the second downstream inner chamber 246 may at least partially react forces exerted on the inner housing 212 against the outer housing 214. Thus, the net axial force between the outer housing 214, the first downstream facing outer contact surface 258a and either or both of the second downstream facing outer contact surface 268a and third or further contact surfaces is at least partially reduced. In some examples, the pressure of the fluid, and hence the force exerted on the outer housing 214, may be such that the net axial forces between the outer housing 214, the first downstream facing outer contact surface 258a and either or both of the second downstream facing outer contact surface 268a and third or further upstream facing contact surfaces are either substantially reduced or at least substantially eliminated.

In some examples, the at least partial reduction of net axial forces between the outer housing 212, the first downstream facing outer contact surface 258a and either or both of the second downstream facing outer contact surface 268a and third or further contact surfaces may at least partially reduce radially directed constraining frictional forces between the inner housing 212 and the outer housing 214. In further examples, the at least partial reduction of net axial forces between the inner housing 212, the first downstream facing outer contact surface 258a and either or both of the second downstream facing outer contact surface 268a and third or further contact surfaces may at least substantially reduce, or at least substantially eliminate radially directed constraining frictional forces between the inner housing 212 and the outer housing 214. If the pressure at the source of pressurised fluid is too high, the axially directed and radially constraining frictional force acting between the inner housing 212 and the outer housing 214 will cease to be balanced such that the inner housing 212 may be radially displaced relative to the outer housing, causing leakage of fluid to occur. Thus, if the pressure differential across the inner housing 212 is too high, fluid flow through either or both of the inner housing 212 and the bristle pack 216 may increase to a level at which either or both of the inner housing 212 and the bristle layer 217 are disturbed and leakage of fluid past the first upstream facing inner contact member 258 will increase. As previously described, the fluid pressure in either or both of the first downstream inner chamber 256 and the second downstream inner chamber 246 may be reduced or modified by providing a constant or variable constriction, or valve, in either or both of the first passageway 272 and the second or further passageway. In preferred examples, the force exerted on the inner housing 212 by pressurised fluid in one or more of the first downstream inner chamber 256, second downstream inner chamber 246, and the third or further downstream inner chamber only partially balances the opposing forces exerted on the inner housing 212 and bristle layer 217 by the fluid in the upstream region 208, so that there is generally a net axial force between the inner housing 212, the first downstream facing outer contact surface 258a and either or both of the second downstream facing outer contact surface 268a and third or further contact surfaces. This gives rise to a radially constraining frictional force on the inner housing 212.

Those skilled in the art will be aware that brush seals are inherently leaky and are designed for a lower, but finite, leakage flow rate through the bristle layer. In a seal according to the invention, leakage flow occurs through the bristles in the normal flow path direction. Means for calculating such flow rates are described in U.S. Pat. No. 6,173,962, which is hereby incorporated by reference.

Figure 7A:
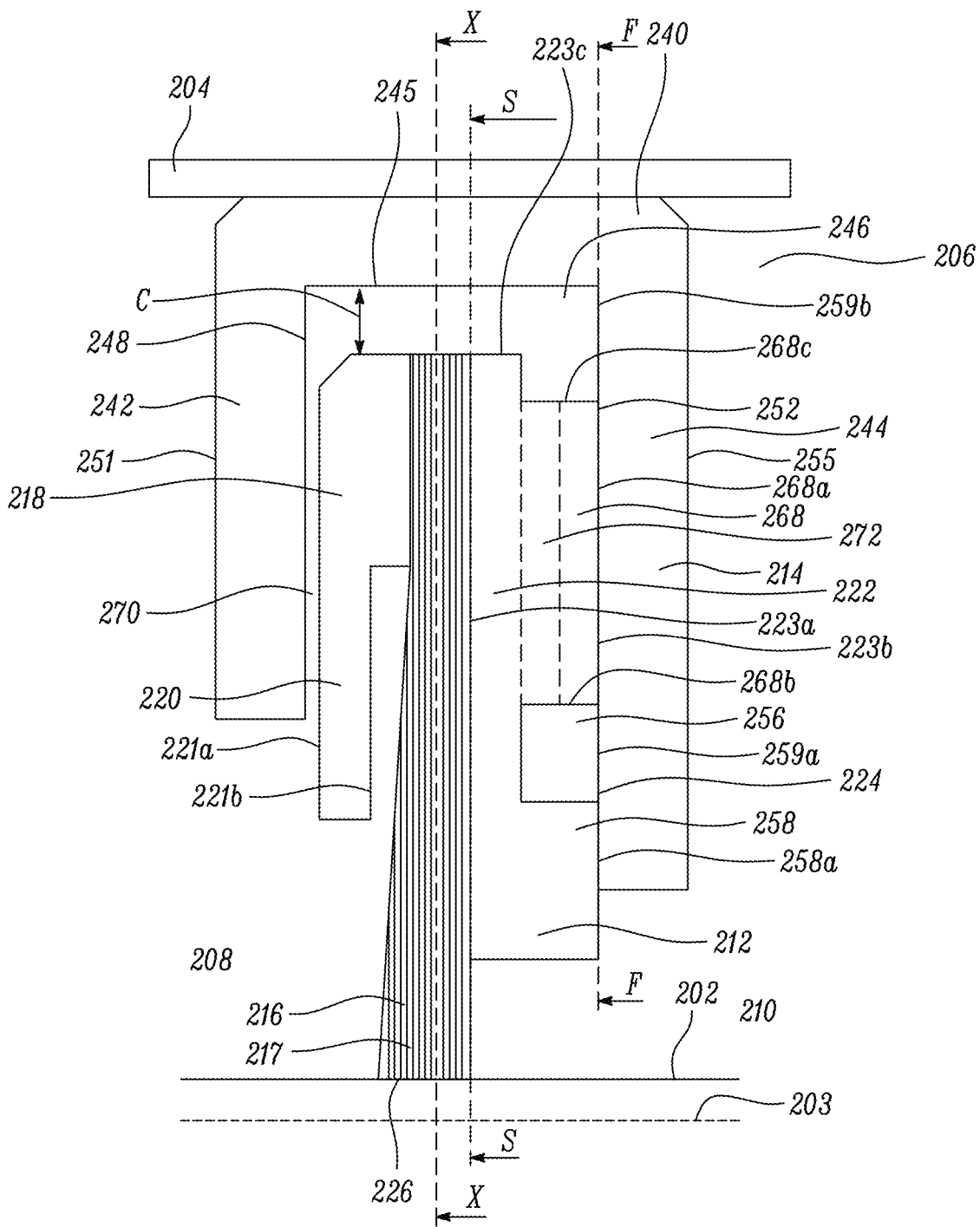
FIG. 7a shows a cross-sectional view of a brush seal arrangement of the present disclosure.
Figure 7B:
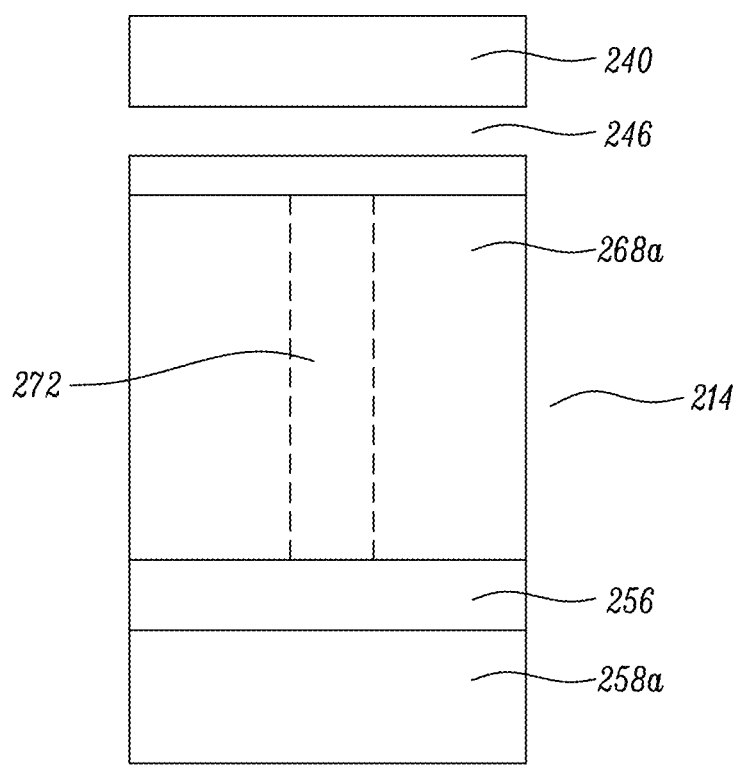

Referring now to FIGS. 7a and 7b, features corresponding to those of FIGS. 5a and 5b, along with 6a and 6b respectively, are given corresponding reference numerals, apart from features which shall now be described. As shown in FIG. 7a, the annular backing member 222 comprises the first downstream outer contact member 258 defining the first downstream facing outer contact surface 258a, and the second downstream outer contact member 268 defining the second downstream facing outer contact surface 268a. The first downstream inner chamber 256 is formed in the downstream facing surface 223b of the annular backing member 222, bound at its inner radius by the first downstream outer contact member 258 defining the first downstream facing outer contact surface 258a, and at its outboard circumference by the second downstream outer contact member 268 defining the second downstream facing outer contact surface 268a. As shown and described in relation to FIGS. 5a to 6b, both the first downstream facing outer contact surface 258a and the second downstream facing outer contact surface 268a are configured along the first radial contact line F-F. The first downstream facing outer contact surface 258a is both distinct from and radially spaced from the second downstream facing outer contact surface 268a along the first radial contact line F-F to define a first downstream inner chamber opening 259a therebetween.

The second downstream outer contact member 268 and second downstream facing outer contact surface 268a are configured, and radially spaced from a radially outward facing end wall 223c of the inner housing 212 to define a second downstream inner chamber 246 therebetween. Furthermore, the second downstream facing outer contact surface 268a is both distinct from and radially spaced from the radially outward facing end wall 223c along the first radial contact line F-F to define a second downstream inner chamber opening 259b therebetween. As shown, the second downstream outer contact member 268 comprises a second radially inner endwall 268b which partly defines a radially outer surface of the first downstream inner chamber 256, and a second radially outer endwall 268c which partly defines a radially outer surface of a second downstream inner chamber 246. Accordingly, the second downstream outer contact member 268 at least partially defines and separates a first downstream inner chamber opening 259a of a first downstream inner chamber 256 and a second downstream inner chamber opening 259b of a second downstream inner chamber 246.

As shown and described in FIG. 7a, at all relative radial positions of the inner housing 212 relative to the outer housing 214 expected during normal use, a collective contact surface along the first radial contact line F-F between the inner housing 212 and the outer housing 214 is greater than a collective surface along the first radial contact line F-F of the downstream inner chamber opening 259a. In some examples, at all relative radial positions of the inner housing 212 relative to the outer housing 214 expected during normal use, a collective contact surface along the first radial contact line F-F between the inner housing 212 and the outer housing 214 is greater than a collective surface along the first radial contact line F-F of both the downstream inner chamber opening 259a and the second downstream inner chamber opening 259b.

It will be appreciated that in further examples not shown, the inner housing 212 may comprise a third or further downstream outer contact member comprising a third or further downstream facing outer contact surface configured along the first radial contact line F-F. The third or further downstream facing outer contact surface may be both located between and radially displaced along the first radial contact line F-F from the first downstream facing outer contact surface 258a and the second downstream facing outer contact surface 268a to at least partially define either or both of a first downstream inner chamber opening 259a of a first downstream inner chamber 256 and a second downstream inner chamber opening 259b of a second downstream inner chamber 246. The third or further downstream facing outer contact surface may further define third or further downstream inner chamber openings of a third or further downstream chambers.

FIG. 7b shows a rear view (viewed from downstream) of the inner housing 212 previously shown in FIG. 7a, viewed on the first radial-azimuthal contact plane F-F. The backing member 222 extends radially inwards from the radially outward facing end wall 223c. The second downstream outer contact member 268 and the second downstream facing outer contact surface 268a are spaced from, and extend radially inwards relative to the radially outward facing end wall 223c, such that the second downstream inner chamber 246 is defined between the radially outward facing end wall 223c and both the second downstream outer contact member 268 and the second downstream facing outer contact surface 268a. Furthermore, the second downstream outer contact member 268 and the second downstream facing outer contact surface 268a are radially spaced from the first downstream outer contact member 258 and the first downstream facing outer contact surface 258a to define the first downstream inner chamber 256 therebetween. Furthermore, in the example shown, both the first downstream outer contact member 258 defining the first downstream facing outer contact surface 258a and the second downstream outer contact member 268 defining the second downstream facing outer contact surface 268a are axially supported by the upstream facing inner surface 252 of the outer housing 214.

In addition, and further to the example shown in FIG. 6b, both FIGS. 7a and 7b show the second downstream outer contact member 268, comprising one or more first downstream inner passageways 272 or channels integrally formed therein. In particular, the or each first downstream inner passageway 272 comprises a passageway formed within and through the body of the second outer contact member 268. In this way, the first downstream inner passageway 272 is configured to fluidly connect at least the first downstream inner chamber 256 and the second downstream inner chamber in the manner described in relation to FIG. 6b. Hence, where applicable, a third or further downstream outer contact member may comprise a second or further downstream inner passageway formed within and through the body of the respective outer contact member, and configured to fluidly connect at least the third downstream inner chamber and the first downstream inner chamber 256. Thus, the first downstream inner passageway 272 and, where applicable, the second downstream inner passageway may be configured to fluidly connect a source of pressurised fluid and either or both of the first downstream inner chamber 256 and the second downstream inner chamber 246.

In further examples, the first downstream inner passageway 272 and, where applicable, the second downstream inner passageway may be configured to fluidly connect the first downstream inner chamber 256 and the second downstream inner chamber 246 only, without any further fluid connection to the relatively high fluid pressure upstream region 208, or a further source of pressurised fluid. In yet further examples, the first downstream inner passageway 272 may be configured to fluidly connect the first downstream inner chamber 256 and the third or further downstream inner chamber only, without any further fluid connection to the relatively high fluid pressure upstream region 208, a further source of pressurised fluid, or the second downstream inner chamber 246.

Referring again to FIG. 7a, in the example shown, the radially extending gap 270 extends along the radial length of the upstream radial wall 242 between the second downstream inner chamber 246 and the relatively high fluid pressure upstream region 208. Thus, the second downstream inner chamber 246 is maintained in fluidic communication with the relatively high fluid pressure upstream region 208 in order to supply the second downstream inner chamber 246 with the high pressure fluid. In this way, high pressure fluid may, in use, at least partially react axially applied forces on the inner housing 212 against the outer housing 214.

By means of the first downstream inner passageway 272, as shown in FIG. 7b, during use, high pressure fluid may flow between the second downstream inner chamber 246 and the first downstream inner chamber 256. Thus, high pressure fluid may, in use, at least partially react radially applied forces on the inner housing 212 against the outer housing 214. Thus, by supplying the second downstream inner chamber 246 with high pressure fluid, the high pressure fluid may be transferred to first downstream inner chamber 256 via the first downstream inner passageway 272, and where relevant, the second or further downstream inner passageway, in order to pressurise both the third or further outer chamber and the first downstream inner chamber 256.

In some examples, the at least partial reduction of net axial forces between the outer housing 214, the first downstream facing outer contact surface 258a and either or both of the second downstream facing outer contact surface 268a and third or further contact surfaces may at least partially reduce radially directed constraining frictional forces between the inner housing 212 and the outer housing 214. In further examples, the at least partial reduction of net axial forces between the inner housing 212, the first downstream facing outer contact surface 258a and either or both of the second downstream facing outer contact surface 268a and third or further upstream facing contact surfaces may at least substantially reduce, or at least substantially eliminate radially directed constraining frictional forces between the inner housing 212 and the outer housing 214.

In addition to the arrangement shown in FIGS. 6a and 6b, the incorporation of the one or more first downstream inner passageways 272 or channels within the second downstream outer contact member 268 enables the second downstream facing outer contact surface 268a area to be maximised. Thus, by increasing the area of contact between the inner housing 212 and the outer housing 214, contact pressure may be reduced. A reduction in contact pressure may lead to a further improvement in fretting wear resistance between the inner housing 212 and the outer housing 214 during use. Wear typically correlates with contact pressure, and may be further influenced by surface speed and interface temperature. The contact load is fixed by the pressures around the inner housing 212 and bristle pack 216. The axially directed contact load may be resisted by the downstream radial wall 244 of the outer housing 214. The contact pressure may be reduced by increasing the surface area of the or each contact area 258a,268a while at the same time leaving the pressures surrounding the inner housing 212 unchanged.

Figure 8A:
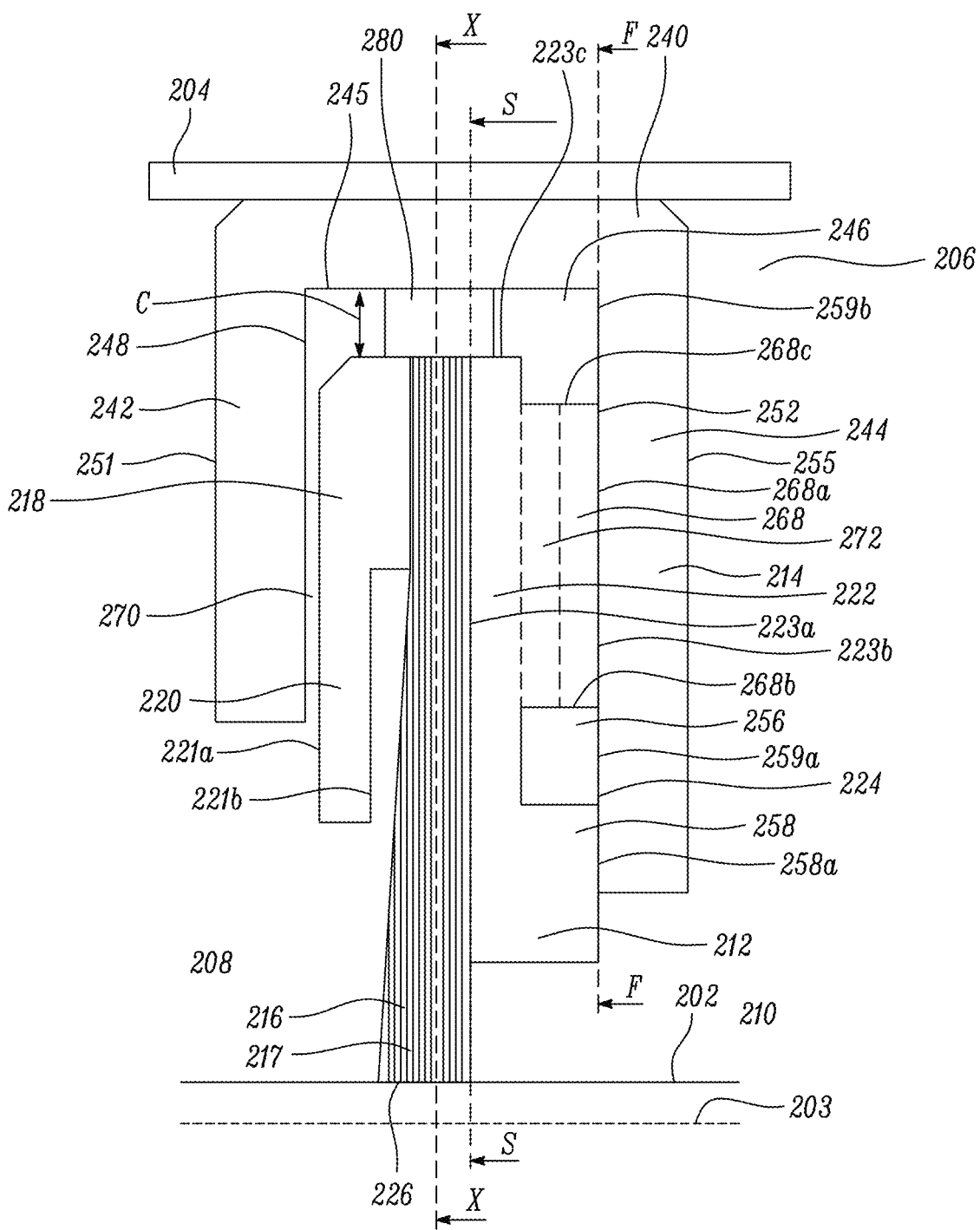
FIG. 8a shows a cross-sectional view of a brush seal arrangement of the present disclosure.
Figure 8B:
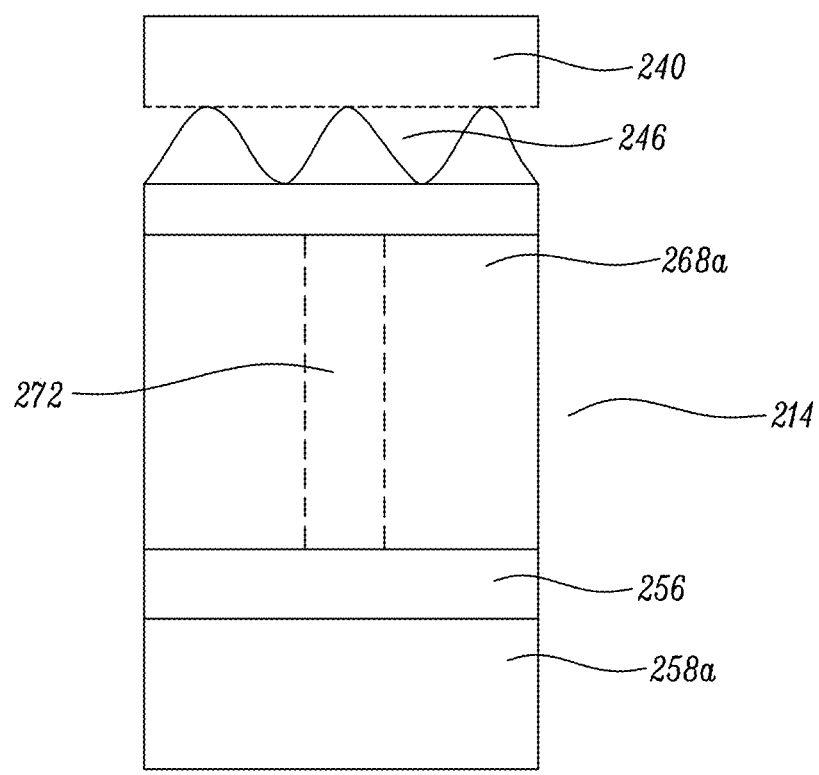

Referring now to FIGS. 8a and 8b, features corresponding to those of FIGS. 5a and 5b, along with 6a, 6b, 7a, and 7b respectively, are given corresponding reference numerals, apart from features which shall now be described. FIG. 8a depicts a similar arrangement to that of FIGS. 7a and 7b, with the addition of an anti-rotation feature 280. The anti-rotation feature is located between the inner housing 212 and the outer housing 214. In particular, the anti-rotation 280 feature is located between the retaining member 218 of the inner housing 212 and the annular retaining wall 240 of the outer housing 214. In the example shown, the anti-rotation feature is provided in the form of a wave spring, which is more clearly shown in FIG. 8b, showing a rear view (viewed from downstream) of the inner housing 212, viewed on the first radial-azimuthal contact plane F-F. By some examples utilising an anti-rotation feature within the brush seal 206 arrangement, pin and slot anti-rotation features may be replaced with an annular wave spring of low radial stiffness. The annular wave spring of low radial stiffness may be spot welded to either or both of the inner housing 212 and the outer housing 214 either partially around, or around the entire circumference of the brush seal 206 arrangement. Thus, when radial movement of the inner is required of the inner housing 212 relative to the outer housing 214, the inner housing 212 may slide relative to the outer housing 214.

For some engine locations where the stack of tolerances is large, the benefit of the sliding occurring, even at very low pressures gives the brush seal 206 the ability to initially "self-centre" and thereby remove the need for increasing the clearance between the inner housing 212 and the shaft 203. The benefit of this is lower leakage through the brush seal 206 and lower bristle tip forces, giving a longer-lasting brush pack. Anti-rotation may be accomplished using a circumferential wave spring arrangement or by a set of radial springs dispersed around the circumference, or a pin and slot.

To further reduce leakage flow rates, and hence reduce leakage flow through the bristles, each of the examples shown and described in relation to FIGS. 5a-8b may be modified by overlaying an additional porous layer over, or axially upstream of the bristle layer 217, or either or both of the first downstream inner chamber 256 and the second downstream inner chamber 246. In some examples, the additional porous layer (not shown) may be located immediately upstream of the bristle layer 217. In further examples, the additional porous layer (not shown) may be located immediately upstream of only a portion of the bristle layer 217. Where applicable, such an additional layer should not significantly damp the bristles to inhibit their ability to accommodate shaft movement etc. Thus, the previously described brush seal arrangements may be located in series relationship with an additional sealing element, so that a further chamber is defined between the respective brush seal arrangement and the fluid in the upstream region 208. Thus, fluid in the further chamber may be maintained or controlled, in use, at a pressure between that of the fluid in the upstream region 208 and the relatively lower pressure downstream region 210. In this way, the fluid pressure supplied to either or both of the first downstream inner chamber 256 and the second downstream inner chamber 246 may be reduced to achieve the described pressure balancing effect.

Figure 9:
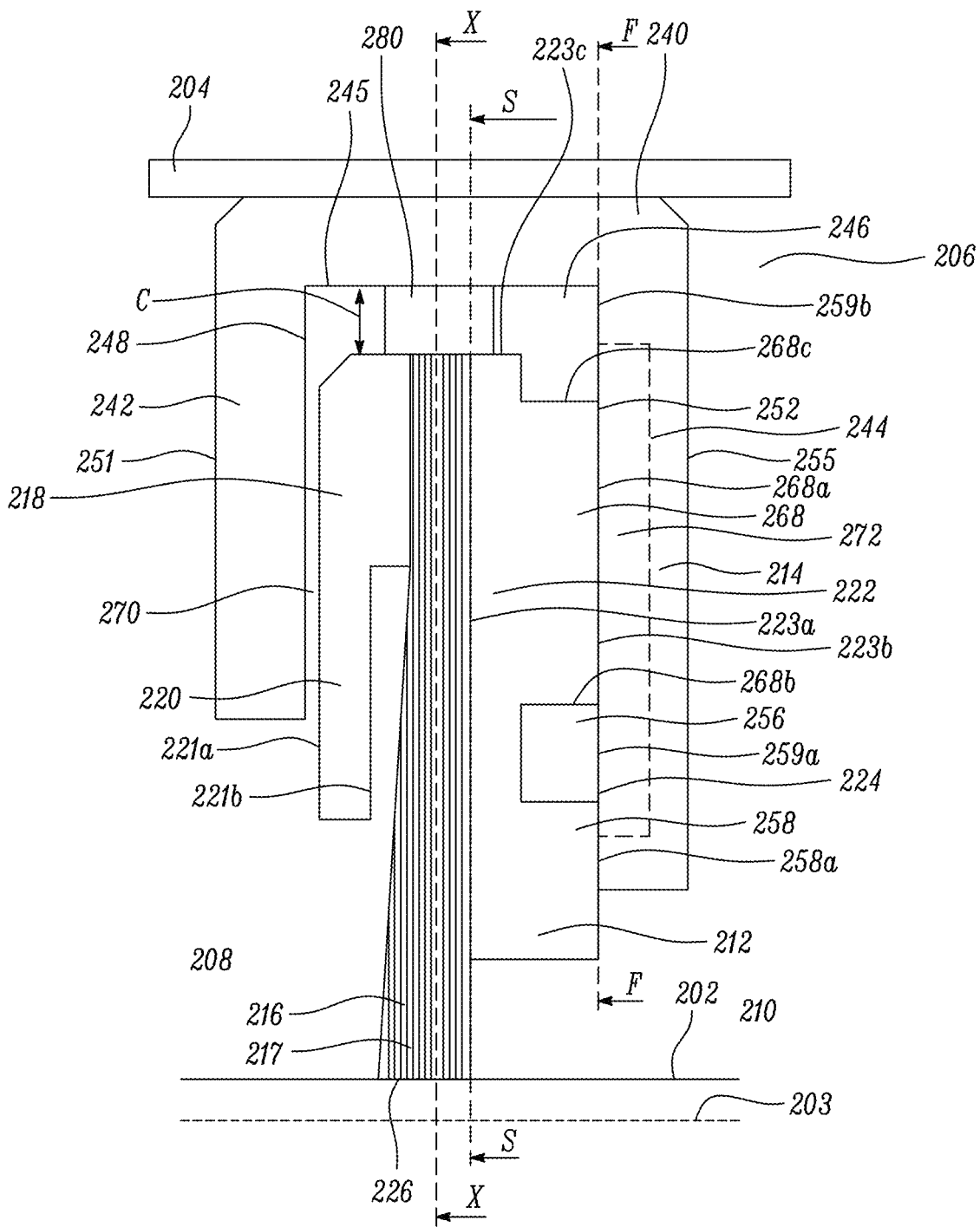
FIG. 9 shows a cross-sectional view of a brush seal arrangement of the present disclosure.
Figure 11:
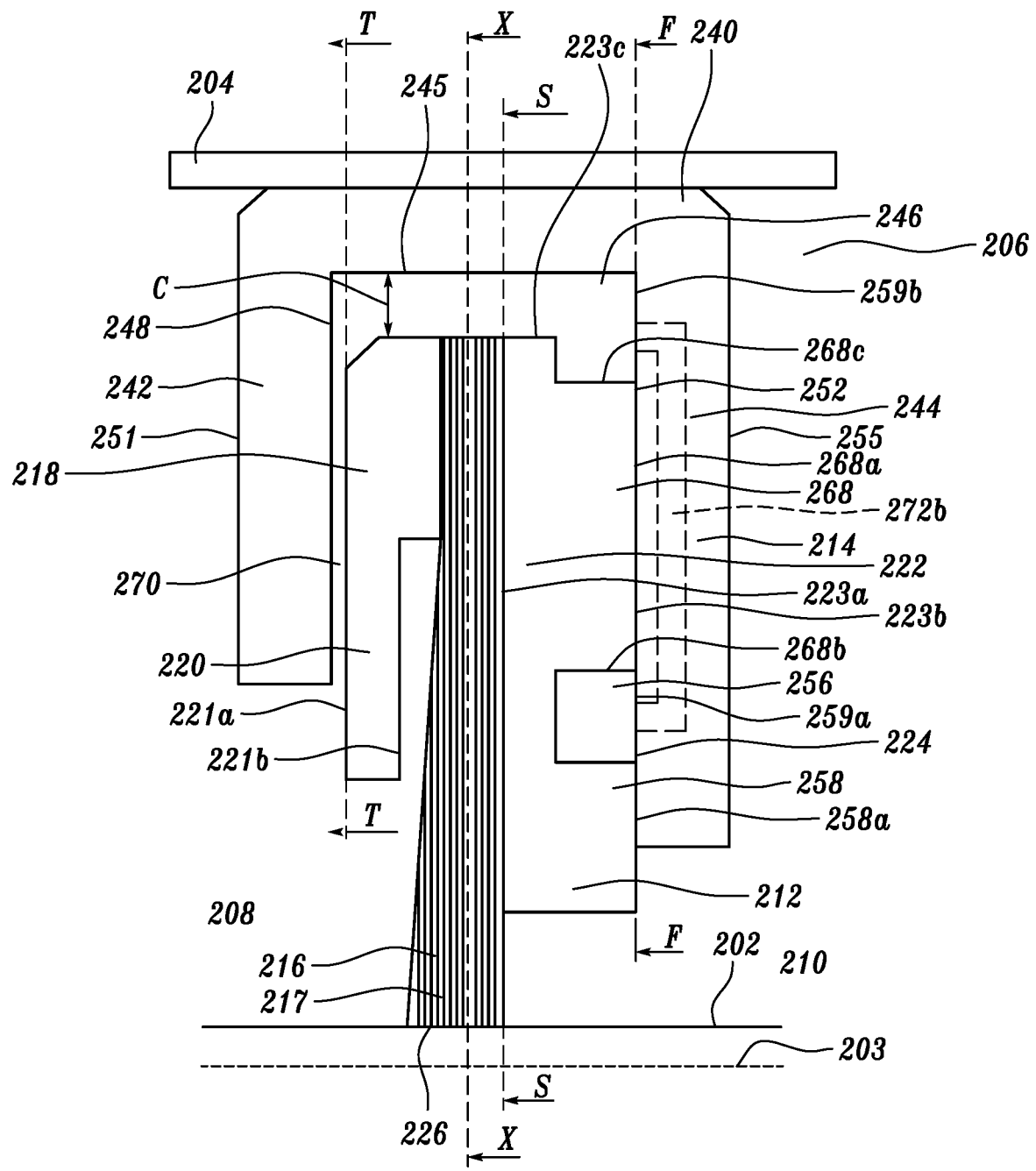

Referring now to FIG. 9, features corresponding to those of the previous figures are given corresponding reference numerals, apart from features which shall now be described. FIG. 9 depicts a similar arrangement to that of FIG. 8a, wherein the or each first downstream inner passageway 272 is instead formed into the upstream facing surface 252 of the downstream radial wall 244 of the outer housing 214 (see also passageway 272b in FIG. 11). Thus, in some examples, the or each first downstream inner passageway 272 may be formed within or through the downstream radial wall 244 of the outer housing 214. In this way, the arrangement may reduce manufacturing complexity of the inner housing 212.

In each example shown or described, it will be appreciated that the bristle layer 217 may be formed from a number of various materials exhibiting suitable stiffness, temperature resistance, creep resistance, erosion resistance and corrosion resistance characteristics. In some examples, the bristle layer 217 may be formed from a multiplicity of tufts of lengths of resilient wire secured to the inner housing 212 by any suitable joining technique, such as welding or brazing or crimping. The particular technique employed will, of course, be dictated by the particular choice of materials employed and the temperatures at which they will be expected to operate. In the examples shown, the bristles comprised within the bristle layer 217 are cobalt alloy wire. In further examples, the bristles comprised within the bristle layer 217 may be comprised of a nickel-based alloy. Furthermore, in the examples shown, the inner housing 212, the outer housing 214, and the respective contact members are nickel based, or a compatible alloy, and are welded together to provide an integral unit. In further examples, it will be appreciated that further materials may be employed, separately or in combination with those disclosed, in order to achieve or provide similar or substantially similar performance, characteristics or material behaviours. Thus, it will be appreciated that one or more of the bristle layer 217, the inner housing 212, the outer housing 214, or the respective contact members, may comprise a number of further alloy-constituents commonly used in gas turbine engine, or high-temperature applications.

Additionally or alternatively, it will be appreciated that one or more of the respective contact surfaces 258a,268a shown or described in relation to any of FIGS. 5a-8b may comprise a hardened surface layer which is relatively harder than a further portion of the inner housing 212 spaced from the or each contact surface 258a,268a. Additionally or alternatively, one or more of the respective contact surfaces 258a,268a shown or described in relation to any of FIGS. 5a-8b may comprise a surface layer which comprises either or both of a relatively lower surface roughness and a relatively lower frictional coefficient than a further portion of the inner housing 212 spaced from the or each contact surface 258a,268a. For example, a diamond like carbon surface treatment may be used on any one or more of the radially inner, radially outer, upstream or downstream surfaces or contact surfaces of either or both of the inner housing 212 and the outer housing 214. Such a diamond like carbon surface treatment may provide any one or more of the treated surfaces with a superior fretting resistance.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A brush seal for sealing a leakage gap in an axial flow path between a relatively higher fluid pressure region and a relatively lower fluid pressure region, comprising an outer housing and an inner housing located at least partially within and configured for radial displacement relative to the outer housing, wherein:

the inner housing comprises a first downstream outer contact member comprising a first downstream facing outer contact surface configured along a first radial contact line, and a second downstream outer contact member comprising a second downstream facing outer contact surface configured, and radially spaced from the first downstream facing outer contact surface, along the first radial contact line to define a downstream inner chamber opening therebetween, the inner housing further comprising a first bristle layer in physical communication with a first upstream facing inner contact surface configured along a second radial contact line, an upstream facing inner surface of the outer housing being maintained in physical communication with at least the first downstream facing outer contact surface and the second downstream facing outer contact surface during radial displacement thereof, at all relative radial positions of the inner housing relative to the outer housing, during use, a collective contact surface area between the upstream facing surface of the outer housing and both the first downstream facing outer contact surface and the second downstream facing outer contact surface is greater than a collective opening area of the downstream inner chamber opening, and the upstream facing inner surface of the outer housing is free of any protrusion toward the first downstream facing outer contact surface and the second downstream facing outer contact surface.

2. The brush seal as claimed in claim 1, wherein the inner housing comprises a first upstream outer contact member comprising a first upstream facing outer surface configured along a third radial contact line.

3. The brush seal as claimed in claim 2, wherein the inner housing comprises a second upstream outer contact member comprising a second upstream facing outer surface configured, and radially spaced from the first upstream facing outer surface, along the third radial contact line to define an upstream inner chamber opening therebetween.

4. The brush seal as claimed in claim 3, wherein at all relative radial positions of the inner housing relative to the outer housing, during use, a collective contact area between a downstream facing surface of the outer housing and the first upstream facing outer surface and the second upstream facing outer surface of the inner housing is greater than a collective opening area of the upstream inner chamber opening.

5. The brush seal as claimed in claim 1, wherein the second downstream outer contact member and second downstream facing outer contact surface are configured, and radially spaced from a radially outward facing end wall of the inner housing, along the first radial contact line, to at least partially define and separate a first downstream inner chamber opening of a first downstream inner chamber and a second downstream inner chamber opening of a second downstream inner chamber.

6. The brush seal as claimed in claim 1, wherein the inner housing comprises a third downstream outer contact member comprising a third downstream facing outer contact surface configured along the first radial contact line, wherein the third downstream facing outer contact surface is both configured between and radially displaced along the first radial contact line from the first downstream facing outer contact surface and the second downstream facing outer contact surface to at least partially define either or both of a first downstream inner chamber opening of a first downstream inner chamber and a third downstream inner chamber opening of a third downstream inner chamber.

7. The brush seal as claimed in claim 6, wherein the third downstream outer contact member comprising the third downstream facing outer contact surface at least partially defines a third downstream inner chamber opening of a third downstream inner chamber.

8. The brush seal as claimed in claim 6, wherein the third downstream outer contact member comprises a second downstream inner passageway configured to fluidly connect at least the third downstream inner chamber and the first downstream inner chamber.

9. The brush seal as claimed in claim 1, wherein the second downstream outer contact member comprises a first downstream inner passageway configured to fluidly connect either the second downstream inner chamber and the first downstream inner chamber or the second downstream inner chamber and a third downstream inner chamber.

10. The brush seal as claimed in claim 9, wherein the first downstream inner passageway is configured to fluidly connect a source of pressurised fluid and either the second downstream inner chamber and the first downstream inner chamber or the second downstream inner chamber and a third downstream inner chamber, and the second downstream inner passageway, where present, is configured to fluidly connect the source of pressurised fluid and at least the third downstream inner chamber and the first downstream inner chamber.

11. The brush seal as claimed in claim 10, wherein the pressurised fluid pressurises one or more of the downstream inner chambers, in use, to a pressure higher than that of the pressure of the relatively lower fluid pressure region.

12. The brush seal as claimed in claim 10, wherein the pressurised fluid pressurises one or more of the downstream inner chambers, in use, to a pressure substantially equal to or less than that of the pressure of the relatively higher fluid pressure region.

13. The brush seal as claimed in claim 10, wherein the pressurised fluid pressurises one or more of the downstream inner chambers, in use, to a pressure substantially equal to or greater than that of the pressure of the relatively higher fluid pressure region.

14. The brush seal as claimed in claim 10, wherein the pressurised fluid, in use, at least partially reacts axially applied forces on the inner housing against the outer housing.

15. The brush seal as claimed in claim 9, wherein a passageway axis of the first downstream inner passageway extends in a direction which is canted in a circumferential direction away from the first radial contact line.

16. The brush seal as claimed in claim 9, wherein the first downstream inner passageway is formed within a portion of the outer housing.

17. The brush seal as claimed in claim 9, wherein the first downstream inner passageway is formed upon a portion of the outer housing.

18. A method for sealing a leakage gap between relatively movable parts in an axial flow path, the method comprising the steps of:
configuring an inner housing and an outer housing of the type claimed in claim 1 between the relatively higher fluid pressure region and the relatively lower fluid pressure region; and,
supplying one or more of a first downstream inner chamber and a second downstream inner chamber with a pressurised fluid to at least partially react axially applied forces on the inner housing against the outer housing.

19. A gas turbine engine for an aircraft comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein:
the gas turbine engine comprises a brush seal as claimed in claim 1.

20. The gas turbine engine as claimed in claim 19, wherein:
the turbine is a first turbine, the compressor is a first compressor, and the core shaft is a first core shaft;
the engine core further comprises a second turbine, a second compressor, and a second core shaft connecting the second turbine to the second compressor; and the second turbine, second compressor, and second core shaft are arranged to rotate at a higher rotational speed than the first core shaft.

\* \* \* \* \*